United States Patent [19]
Shimamura et al.

[11] Patent Number: 6,038,683
[45] Date of Patent: Mar. 14, 2000

[54] REPLICATED CONTROLLER AND FAULT RECOVERY METHOD THEREOF

[75] Inventors: Kotaro Shimamura; Yuuichiro Morita; Yoshitaka Takahashi; Takashi Hotta; Hiroyasu Satou; Shigeta Ueda; Akira Bando, all of Hitachi; Hirokazu Suzuki, Yokohama; Koji Sakamoto, Kawasaki, all of Japan

[73] Assignee: Hitachi, Ltd., Tokyo, Japan

[21] Appl. No.: 09/040,146

[22] Filed: Mar. 17, 1998

[30] Foreign Application Priority Data

Mar. 19, 1997 [JP] Japan ................................. 9-066731

[51] Int. Cl.$^7$ .................................................. G06F 11/00
[52] U.S. Cl. .............................................. 714/11; 707/202
[58] Field of Search .................................. 714/11, 1, 2, 4, 714/6, 7, 8, 13, 18, 20, 31, 39, 48; 707/202, 204; 395/200, 200.01, 200.06

[56] References Cited

U.S. PATENT DOCUMENTS

| | | | |
|---|---|---|---|
| 4,580,214 | 4/1986 | Kubo et al. | 364/200 |
| 4,972,473 | 11/1990 | Ejiri et al. | 380/20 |
| 5,572,678 | 11/1996 | Homma et al. | 395/200.12 |
| 5,598,529 | 1/1997 | Garay et al. | 395/182.09 |
| 5,751,955 | 5/1998 | Sonnier et al. | 395/200.19 |
| 5,790,776 | 8/1998 | Sonnier et al. | 395/189.08 |
| 5,913,219 | 6/1999 | Baek et al. | 707/202 |

*Primary Examiner*—Robert W. Beausoliel, Jr.
*Assistant Examiner*—Nadeem Iqbal
*Attorney, Agent, or Firm*—Kenyon & Kenyon

[57] ABSTRACT

A replicated controller and a fault recovery method therefor which can restore a faulty system to a normal state without interrupting operation of an equipment, even in an equipment controller performing processing with short operating periods.

In a fault recovery method for a replicated controller, control data is divided into a plurality of blocks on the basis of dependency of the blocks, and a plurality of blocks are transferred in a sequential order of superiority of the dependency from the normally operating system to the faulty system in a period over a plurality of operating periods. BY this, even in an equipment controller performing processing at a short operating period, the system, in which failure is caused, can be restored into normal state without interrupting operation of the equipment.

4 Claims, 25 Drawing Sheets

$P_k = P_{k-1} + V_k I_k / \pi$ $Q_k = Q_{k-1} + (4 V_k I_k \sin\theta_k \cos\theta_k / \pi$

```
if(tV_k = 1) {
  OP_k = OP_{k-1} + gp (PI - P_k)
  OQ_k = OQ_{k-1} + gq (QI - Q_k)
}
else {
  OP_k = OP_{k-1}
  OQ_k = OQ_{k-1}
}
OV_k = OP_k sin θ_k + OQ_k cos θ_k
```

FIG.14

1:  $t_k = t_{k-1} + \Delta t$
2:  for (i=n; i>1; i--) {
3:  $V_k^{(i)} = V_{k-1}^{(i-1)}$
4:  }
5:  $V_k^{(i)} = V_k$
6:
7:  (CALCULATION OF $V0_k$)
8:
9:  $d0 = \sum_{i=1}^{n} | V_k^{(i)} - V0_{k-1} \sin\{2\pi (t_k - t0_{k-1} - (i-1)\Delta t) / T_{k-1}\} |$
10:
11:  $dp = \sum_{i=1}^{n} | V_k^{(i)} - (V0_{k-1} + \Delta V) \sin\{2\pi (t_k - t0_{k-1} - (i-1)\Delta t) / T_{k-1}\} |$
12:
13:  $dm = \sum_{i=1}^{n} | V_k^{(i)} - (V0_{k-1} + \Delta V) \sin\{2\pi (t_k - t0_{k-1} - (i-1)\Delta t) / T_{k-1}\} |$
14:
15:  if (d0 < dp) {
16:    if (d0 < dm) {$V0_k = V0_{k-1}$}
17:    else {$V0_k = V0_{k-1} - \Delta V$}
18:  }
19:  else {
20:    if (d0 < dm) {$V0_k = V0_{k-1} + \Delta V$}
21:    else {$V0_k = V0_{k-1} - \Delta V$}
22:  }
23:
24:  (CALCULATION OF $t0_k$)
25:  SAME AS ABOVE
26:
27:  (CALCULATION OF $T_k$)
28:  SAME AS ABOVE
29:
30:  if ($t_k - t0 > T_k$) {
31:    $t_k = t_k - Tt$
32:    $tVk = 1$
33:  }
34:  else {$tVk = 0$}
35:  $\theta_k = 2\pi (t_k - t0) / T_k$

```
1:    φk = φk + 1
2:    if (iφ = 2m) { φk = 0}
3:    if (φk < m) {
4:        Sk = 0
5:        Va = 2VM φk / m-VM
6:        Vb = 2VM (φk +1) / m-VM
7:    }
8:    else {
9:        Sk = 1
10:       Va = 2VM (2m - φk -1) / m-VM
11:       Vb = 2VM (2m - φk) / m-VM
12:   }
13:   if ((OVk >= Va) & (OVk < Vb) {
14:       Ck = CM(OVk -Va)/(Vb-Va)
15:   }
16:   else {
17:       Ck = CM + 1
18:   }
```

FIG.19
(a)
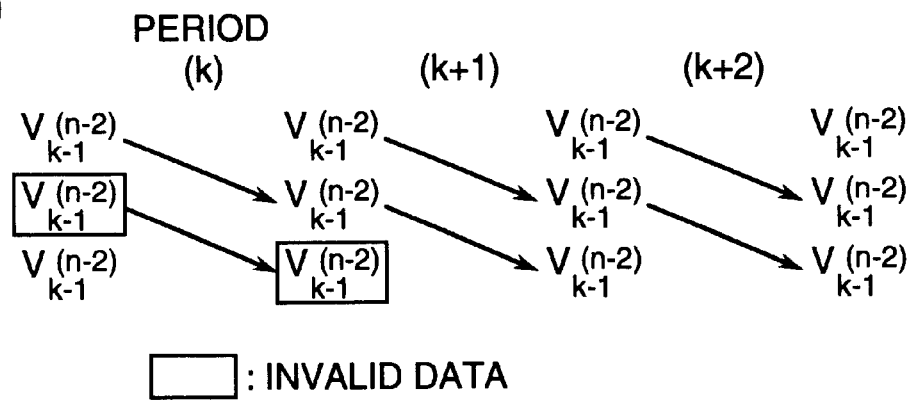
(b)
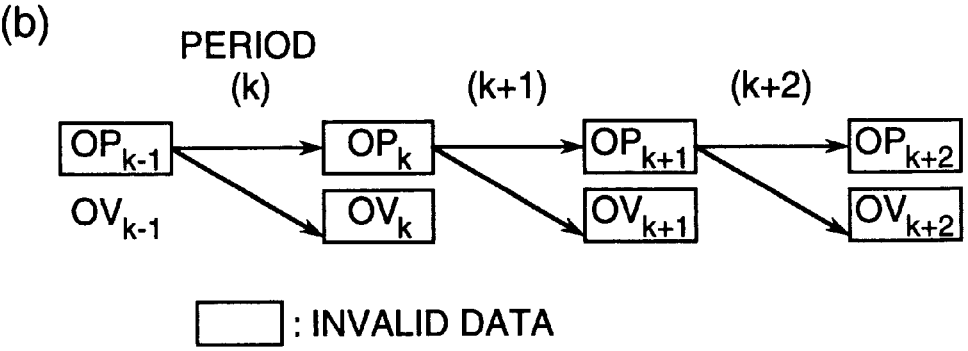
(c)
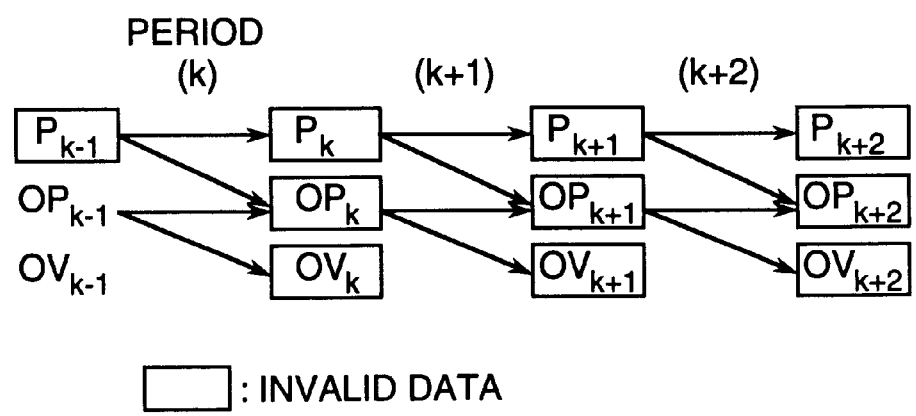

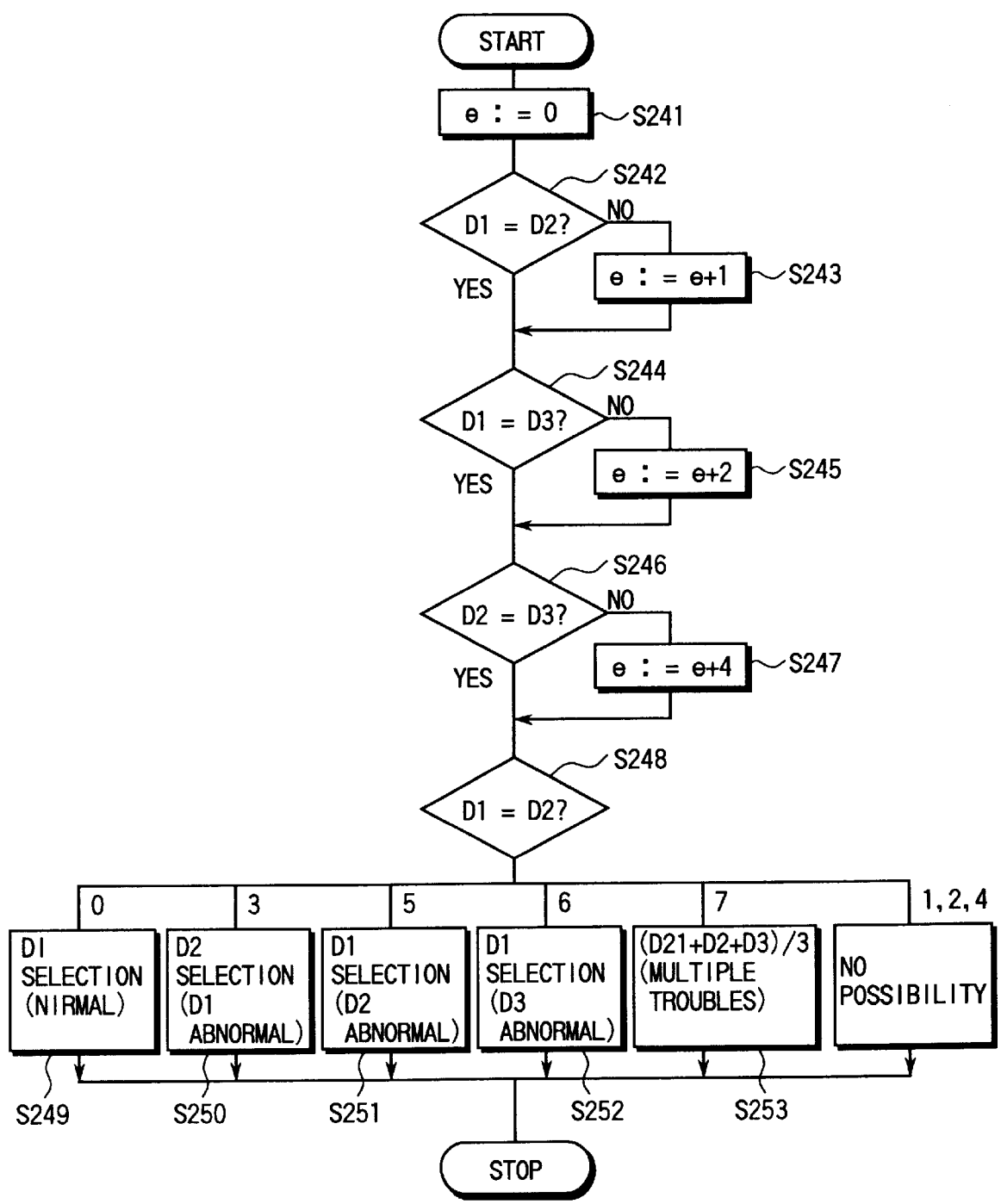

FIG.28
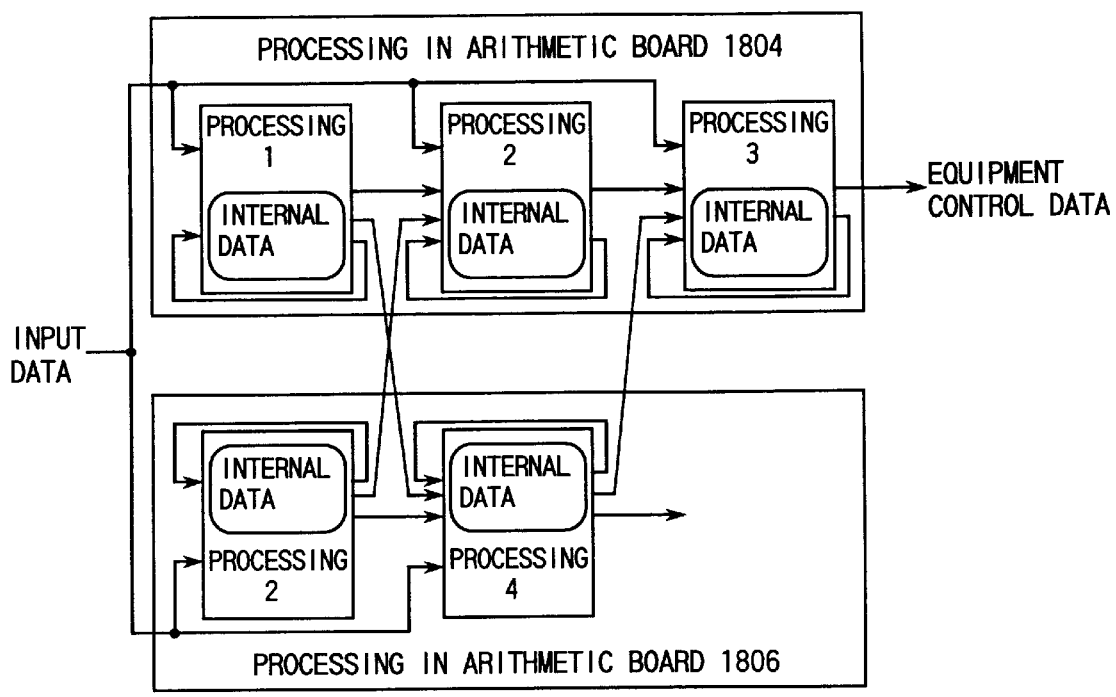
FIG.29
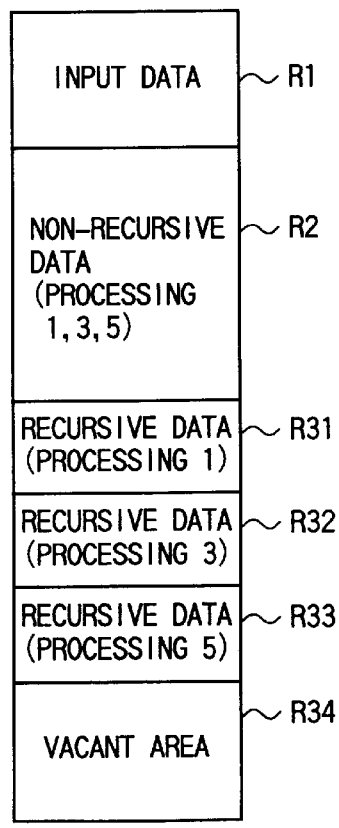
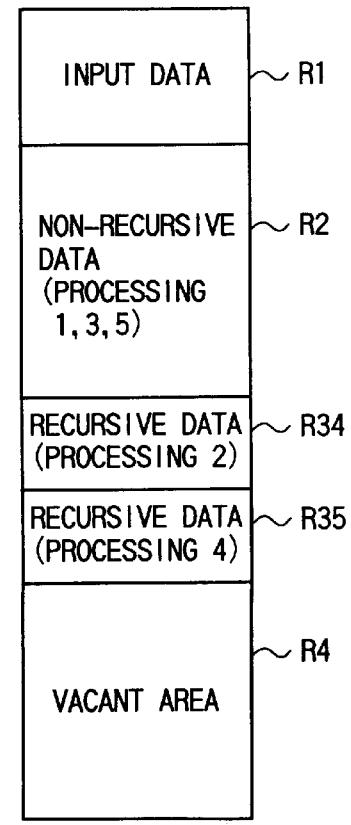

REPLICATED CONTROLLER AND FAULT RECOVERY METHOD THEREOF

BACKGROUND OF THE INVENTION

The present invention relates generally to a replicated controller and a fault recovery method thereof. More specifically, the invention relates to a replicated controller and a fault recovery method thereof which can recover failure without interrupting operation of an objective equipment to be controlled upon occurrence of failure in the replicated controller.

A controller controlling equipment, such as a power converter, is required high reliability since influence of failure becomes more significant for greater objective equipment to be controlled. Therefore, in the controller for controlling a large scale equipment, it has been taken a method to enhance reliability of control by replicating the controllers to provide a plurality of mutually identical controllers in a plurality of systems, so that even if failure is caused in one system of controllers, control is performed by using a normal output from the controller in the remaining systems.

As a fault recovery method when failure is caused in the conventional replicated controller, a transfer region storing control data necessary for fault recovery. is provided in each system of the replicated controllers. Upon occurrence of failure in a certain system, the data in the transfer region is transferred to the system, in which failure is caused, during a vacant period in a processing of the normal system, with maintaining control of the equipment by the output of the normal system, and the system, in which failure is caused, is restarted after completion of transfer of the data. By this, it becomes possible to restore the faulty system into the normal state without interrupting operation of the objective equipment to be controlled, and whereby to provide the controller with high reliability.

However, when the conventional fault recovery method for the replicated controller is applied to the controller for the equipment performing processing at a short operating period, it becomes impossible to transfer all data within vacant time in one operating period. If the data in the transfer region is transferred over a plurality of operating periods, the data updated by the normal system during a plurality of operating periods, in which data of the transfer region is transferred to the faulty system, cannot be transferred to the faulty system to make it impossible to match all data in the transfer region with data in the normal system. For this reason, it is inherently necessary to inhibit updating of data in the normal system while the data in the transfer region is transferred to the faulty system to make it impossible to continue control of the equipment.

SUMMARY OF THE INVENTION

It is therefore an object of the present invention to provide a replicated controller and a fault recovery method therefor which can restore a faulty system to a normal state without interrupting operation of an equipment, even in an equipment controller performing processing with short operating periods.

In order to accomplish the above-mentioned object, in a fault recovery method for a replicated controller in accordance with the present invention, control data is divided into a plurality of blocks on the basis of dependency of the blocks, and a plurality of blocks are transferred in a sequential order of superiority of the dependency from the normally operating system to the faulty system in a period over a plurality of operating periods. By this, even in an equipment controller performing processing at a short operating period, the system, in which failure is caused, can be restored into normal state without interrupting operation of the equipment.

In the method set forth above, the control data is transferred from the normally operating system to the faulty system after performing normal processing for a given period in the faulty system. By this, data which cannot be restored at one operating period, may be restored into normal data, finally.

On the other hand, one of a plurality of blocks are exchanged between the systems per each operating period regardless of the presence or absence of failure detection so that a value having the highest certainty of validness is presumed for using at the next operating period when inconsistency is present between the values in respective systems. By this, software scheme can be simplified. Also, even if failure which cannot be detected in the normal method, normal processing can be continued.

In a replicated controller, according to the present invention, a transfer region has a plurality of regions for storing data divided into a plurality of blocks depending upon dependency between the blocks so that data stored in the plurality of blocks are transferred from a normally operated system to the faulty system in a sequential order of superiority of dependence, over a plurality of operating periods. By this, even in an equipment controller performing processing at a short operating period, the system, in which failure is caused, can be restored into normal state without interrupting operation of the equipment.

BRIEF DESCRIPTION OF THE DRAWING

FIG. 14 is a view showing an example of concrete processing of phase detection for obtaining phase θ shown in FIG. 13.

FIG. 19(a), FIG. 19b, & FIG. 19(c) are views showing the relationship between the content of computation processing and a reaching influence of the fault shown in FIG. 12.

FIG. 24 is a flowchart showing the flow of the processing in a recursive data selecting step shown in FIG. 23.

FIG. 28 is a view showing the flow of data in the processing of the arithmetic boards 1804 and 1806 shown in FIG. 25.

FIG. 29 is a view showing the arrangement of data stored in a RAM 316 of the arithmetic boards 1804 and 1806 shown in FIG. 25.

DESCRIPTION OF THE PREFERRED EMBODIMENT

The preferred embodiment of the present will be discussed hereinafter with reference to the accompanying drawings.

Figure 1:
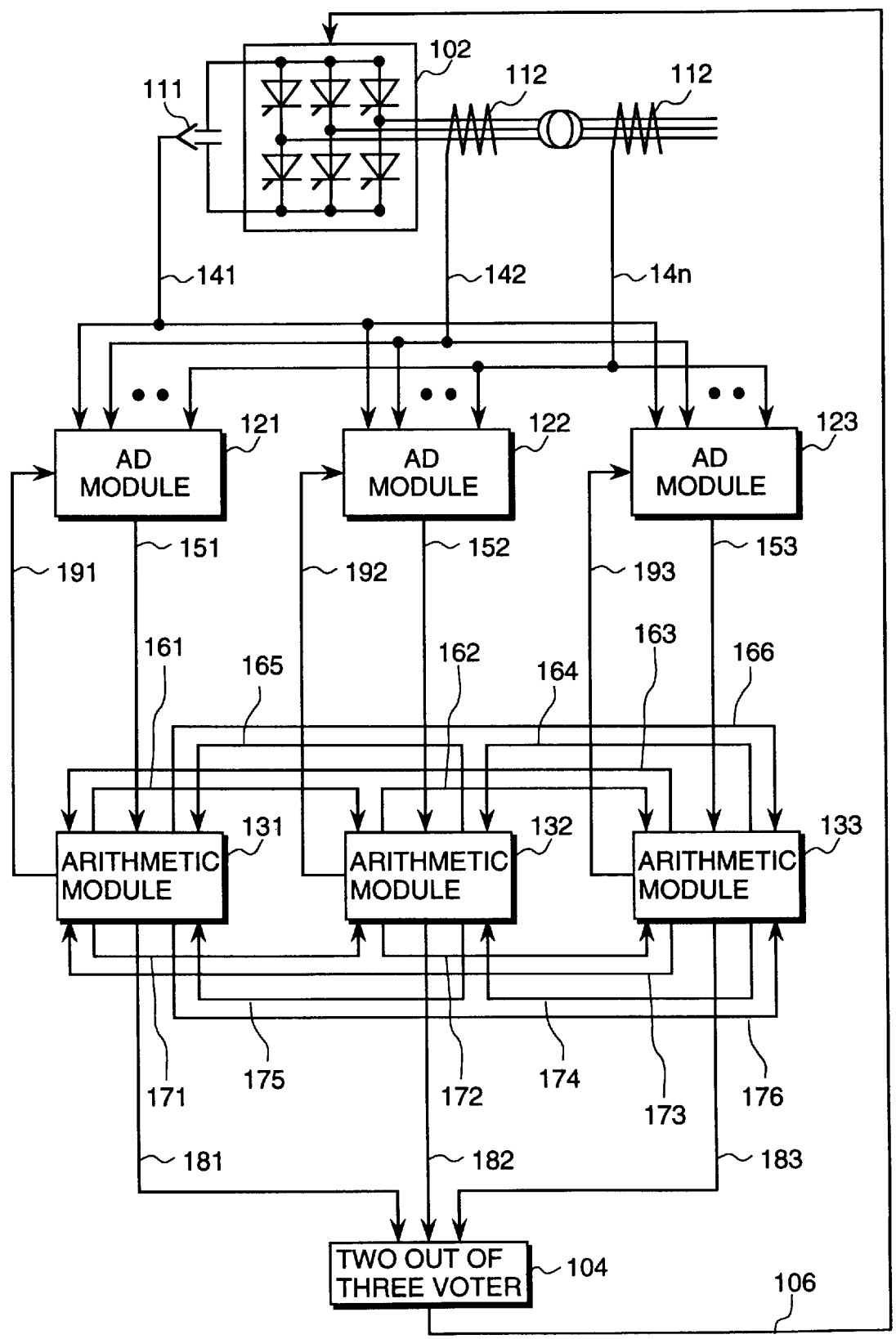
FIG. 1 is a block diagram showing the configuration of a first embodiment of a control apparatus for a power converter according to the present invention.

FIG. 1 is a block diagram showing the first embodiment of a power converter controller, to which the present invention is applied.

In FIG. 1, in the vicinity of a power converter 102 performing conversion between an alternating current power and a direct current power, a power source inputting the direct current power to the power converter 102, and sensors 111 to 11n for detecting current values and voltage values within the power converter 102 and an electric system connected to the power converter 102, and converting the detected current values and voltage values into electric signals of small power, are provided. Output terminals of the sensors 111 to 11n are respectively connected to input ports of AD modules 121 to 123 for converting analog signals into digital signals via signal lines 141 to 14n. The input ports of respective AD modules 121 to 123 are connected to output ports of arithmetic modules 131 to 133 designating conversion timing from analog signals into digital signals of respective AD modules 121 to 123. The output ports of respective AD modules 121 to 123 are connected to input ports of arithmetic modules 131 to 133 via respective signal lines 151 to 153. The input/output ports of the arithmetic modules 131 to 133 are mutually connected via signal lines 161 to 166 and 171 to 176. The output ports of the arithmetic modules 131 to 133 are connected to input ports of a two out of three voter 104 which outputs a signal having greater number of the same signal among a plurality of input signals, via respective signal lines 181 to 183. The output ports of the two out of three voter 104 is connected to a switching terminal of each switching device forming the power converter 102 via the signal line 106.

Next, operation of the shown embodiment of the power converter controller will be discussed hereinafter.

The current values and the voltage values of the power source supplying the power to the power converter 102, within the power converter 102 and the electric system connected to the power converter 102 are detected by the sensors 111 to 11n, converted into electric signals of small power by the sensors 111 to 11n and input into the AD modules 121 to 123 via the signal lines 141 to 14n. After converting the input analog signals into the digital signals, respective AD modules 121 to 123 transfers respective arithmetic modules 131 to 133 via respective signal lines 151 to 153. Conversion from the analog signals to the digital signals in the AD modules 121 to 123 are adapted to the timings designated from the arithmetic modules 131 to 133 via respective signal lines 191 to 193.

The arithmetic module 131 transmits synchronizing signals to respective of arithmetic modules 132 and 133 via signal lines 171 and 176, and receives synchronizing signals from the arithmetic modules 132 and 133 via the signal lines 175 and 173. The arithmetic module 131 generates a start signal for AD converting operation for the AD module 121 on the basis of the synchronizing signals transmitted through the signal lines 171 and 176 and the synchronizing signals received through the signal lines 175 and 173, and transmit the generated operation start signal to the AD module 121 via the signal line 191. On the other hand, the arithmetic module 131 receives data from the AD module 121 via the signal line 151 and transmits the received data from the AD module 121 toe the arithmetic module 132 and 133 via respective signal lines 161 and 166, and in conjunction therewith, receives data from the AD modules 122 and 123 via the arithmetic modules 132 and 133 through respective signal lines 165 and 163. When data is received from all of three AD modules 121, 122 and 123, the arithmetic module 131 makes judgment whether permanent failure, such as breakage, shorting and so forth, is caused in any one of three AD modules 121, 122 and 123 according to the specified algorithm, in which excessively different data is judged as abnormal, selects data from the AD module, in which failure is not caused, generates a pulse-width-modulated control pulse for controlling operation of the power converter 102 and transmits the control pulse to the two out of three voter 104 via the signal line 181. Other arithmetic modules 132 and 133 performs identical operation as those of the arithmetic module 131. Namely, the arithmetic modules 131, 132 and 133 performs identical arithmetic operation using data from the same AD module. Accordingly, the arithmetic modules 131, 132 and 133 should generate the identical control pulses. If the control pulses generated by respective arithmetic modules are not consistent as compared, judgment can be made that failure is caused in any one of the arithmetic module.

Figure 2:
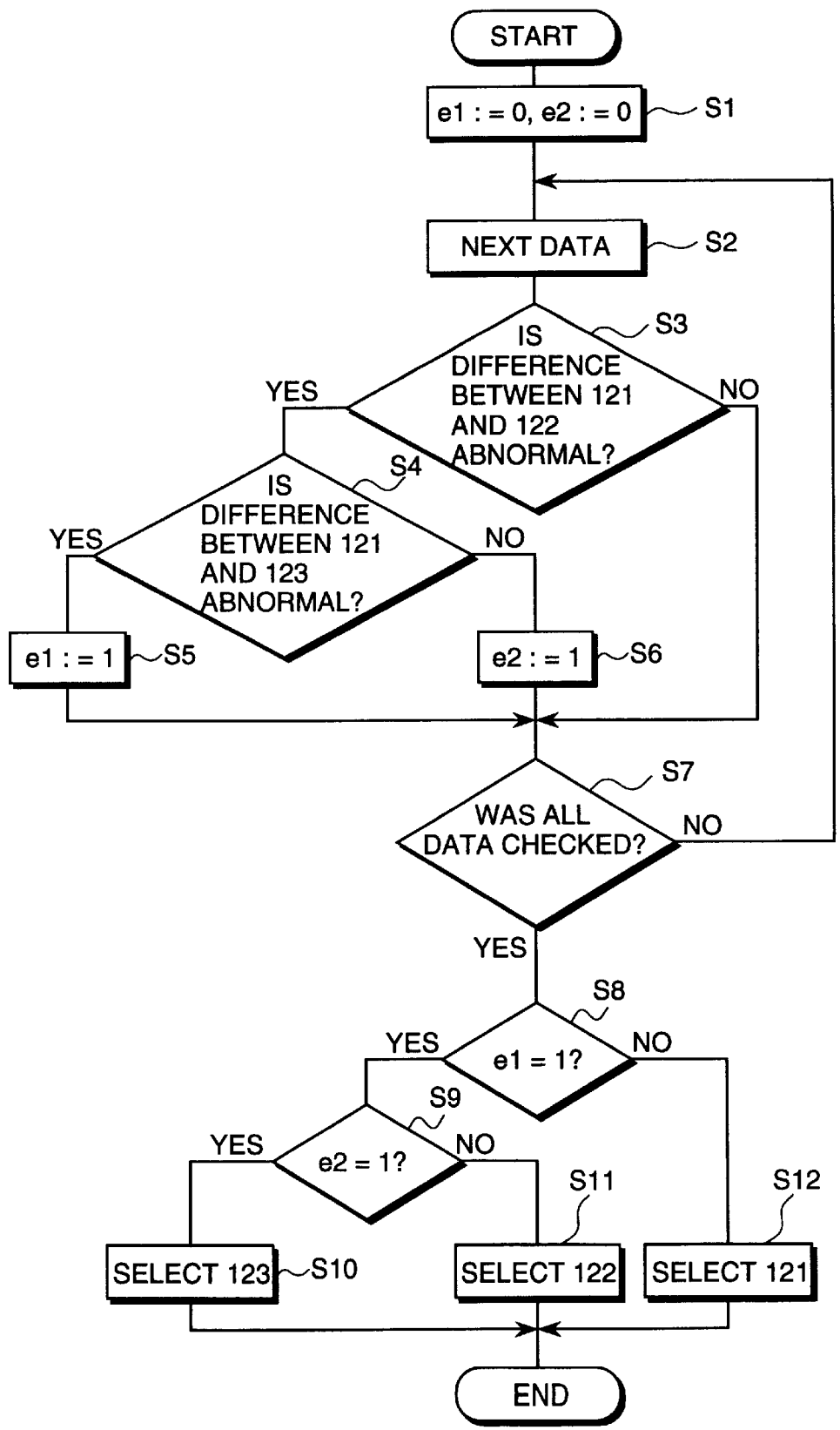
FIG. 2 is a flowchart showing algorithm for selecting one of data received by an arithmetic module.

FIG. 2 is a flowchart showing algorithm for selecting data from the AD module among the AD modules 121, 122 and 123, in which failure is not caused. The selecting operation of the arithmetic module 131 will be discussed with reference to the shown flowchart.

The arithmetic module 131 initially sets a parameter e1 indicative that the AD module 121 is in fault and a parameter e2 indicative that the AD module 122 is in fault (step S1).

Next, check is performed whether abnormality is present or not, for all of data received from the arithmetic module 131. Since error is contained in a result of AD conversion, inconsistency of data from two AD modules does not always represent occurrence of failure in the AD modules. Therefore, detection of abnormality is performed by comparing data from two AD modules and depending upon whether a difference between data from both AD modules falls within a predetermined range of values. If the difference between data from both AD modules does not fall within the predetermined value range, judgment can be made that one of two data is abnormal. Conversely, when the difference between data from both AD modules falls within the predetermined value range, judgment can be made that both of two data are normal. In order to perform such judgment operation, the arithmetic module 131, at first, receives data to be judged (step S2), calculates a difference of data from the AD modules 121 and 122, and makes judgment whether the difference falls within the predetermined value range (step s3).

When the difference of data from the AD module 121 and data from the AD module 122 exceeds the predetermined value and thus judgment is made that failure is caused in one of the AD modules, judgment is made whether abnormality is present in either AD modules 121 or 122 based on the difference between data (step S4).

When the difference between data from the AD modules 121 and 123 exceeds the predetermined value range and thus, judgment is made that failure is caused in either AD modules, judgment is made that failure is caused in the AD module 121. Then, the parameter e1 indicative of failure in the AD module 121 is set to one (1) (step S5).

When the difference between data from the AD modules 121 and 122 indicates that failure is caused in either the AD modules 121 and 122 and the difference between data from AD modules 121 and 123 falls within the predetermined value range and thus, judgment is made that failure is not caused in either AD modules, judgment is made that failure is caused in the AD module 122. Then, the parameter e2 indicative of failure in the AD module 122 is set to one (1) (step S6).

When the difference between data from the AD modules 121 and 122 falls within the normal range, judgment is made that both of the AD modules 121 and 122 are in normal state. Then, parameters e1 and e2 are not varied.

When abnormality detection for all data is completed (step S7), the arithmetic module 131 performs selection of data according to the result of abnormality detection. At first, check is made whether the parameter e1 is one (1) or not (step S8). If the parameter e1 is 1, check is performed whether the parameter e2 is one (1) or not (step S9).

When both of the parameters e1 and e2 are one (1), the arithmetic module 131 selects data from the AD module 123 (step S10). When the parameter e1 is one (1) and the parameter e2 is zero (0), the arithmetic module 131 selects data from the AD module 122 (step S11). On the other hand, when the parameter e1 is zero (0), the arithmetic module 131 selects data from the AD module 121 (step S12).

The arithmetic module 131 generates the pulse-code-modulated control pulse controlling operation of the power converter 102 using thus selected data, and transmits the control pulse to the two out of three voter 104 via the signal line 181.

The two out of three voter 104 receives the control pulses for the power converter 102 from the three arithmetic modules 131 to 133 via the signal lines 181 to 183 to perform two out of three voting for selecting the control pulse in majority among the input control pulses. Thereafter, the selected control pulse is transmitted to the switching terminals of respective switching devices of the power converter 102. Even if failure is caused in any one of the arithmetic module, the valid control pulse can be selected and transmitted to the power converter 102, and thus normal processing can be continued to attain high reliability.

Figure 3:
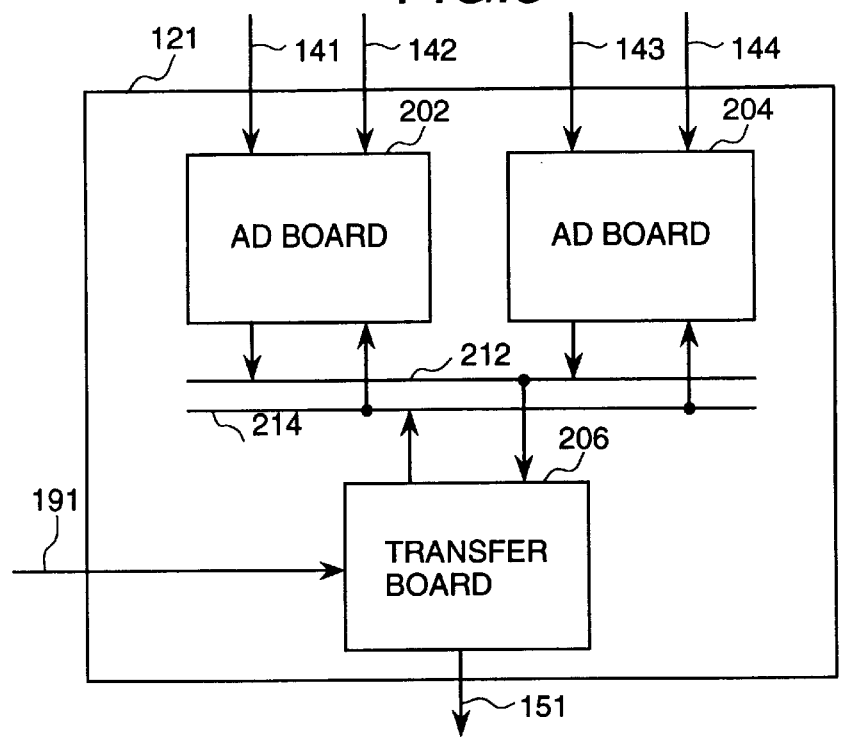
FIG. 3 is a block diagram showing concrete configuration of an AD module 121 shown in FIG. 1.

FIG. 3 is a block diagram showing a particular construction of the AD module 121 of the power converter controller of FIG. 1. Here, for the purpose of simplification of disclosure, an example, in which four sensors are employed, is illustrated.

The AD module 121 has AD boards 202 and 204 for converting the analog signals into digital signals and a transfer board 206 controlling transfer of the converted digital data. To the input ports of the AD board 202, signal lines 141 and 142 are connected, and to the output port thereof, a data bus 212 is connected. On the other hand, to the input ports of the AD board 204, to which a control signal 214 is input, the signal lines 143 and 144 are connected, and the output port thereof is connected to a data bus 212. To the input ports of the transfer board, to which the control signal 214 is input, the signal line 191 and a data bus 212 are connected, and to the output port thereof, the signal line 151 is connected to output the control signal 214.

Next, the operation of the AD module 121 will be discussed.

The AD board 202 is responsive to a command for initiating AD conversion from the transfer board 206 by the control signal 214, to perform analog to digital conversion for the signal received from the sensors 111 and 112 via the signal lines 141 and 142. On the other hand, the AD board 202 is responsive to a command for reading out the state from the transfer board 206 by the control signal 214, to output a signal indicative of state of progress of own AD converting operation to the data bus 121. On the other hand, when the a command for reading out of data is received from the transfer board 206 by the control signal 214, the AD board 202 outputs converted digital data to the data bus 212. The operation of the AD board 204 is the same as those of the AD board 202.

The transfer board 206 is responsive to an operation start signal via the signal line 191 to output the control signal 214 to transmit the command for initiation of AD conversion to the AD boards 202 and 204. Subsequently, by way of the control signal 214, the transfer board 206 transmits the command for reading out the states of the AD boards 202 and 204 to receive the signals indicative of the states of the AD boards 202 and 204 via the data bus 212. When the signals indicative of the states represent that the AD boards 202 or 204 are in AD conversion, reading out of the state is repeated until completion of AD conversion. When AD conversion is completed in both of the AD boards 202 and 204, the transfer board 206 transmits the control signal to send the command for reading out the data to the AD board 202 and 204 to receive data via the data bus 212. Once all of data corresponding to four sensors are received, the transfer board 206 outputs the received data to the signal line 151.

The AD modules 122 and 123 of the power converter controller of FIG. 1 are constructed similarly to the AD module 121 to perform the same operation.

Figure 4:
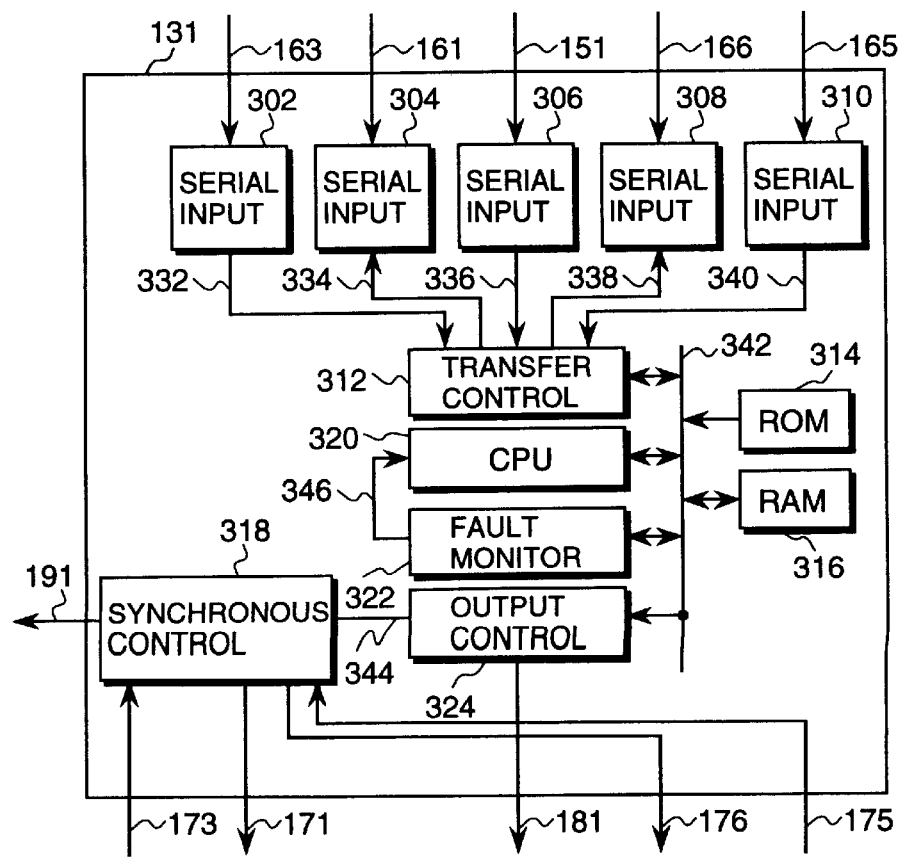
FIG. 4 is a block diagram showing the concrete configuration of an arithmetic module 131 shown in FIG. 1.

FIG. 4 is a block diagram showing the concrete configuration of an arithmetic module 131 shown in FIG. 1.

In the figure, a signal line 163 is connected to an input port of a serial input circuit 302 for converting serial data into parallel data. An output port of the serial input circuit 302 is connected through a signal line 332 to an input port of a transfer control circuit 312 for temporarily storing an input signal in an internal memory and outputting the stored data at a request of read-out. A signal line 161 is connected to an output port of a serial output circuit 304 for converting parallel data into serial data. An input port of the serial output circuit 304 is connected through a signal line 334 to an output port of the transfer control circuit 312. A signal line 151 is connected to an input port of a serial input circuit 306, and an output port of the serial input circuit 306 is connected through a signal line 336 to the input port of the transfer control circuit 312. A signal line 166 is connected to an output port of a serial input circuit 308, and an input port of the serial output circuit 308 is connected through a signal line 338 to the output port of the transfer control circuit 312. A signal line 165 is connected to an input port of a serial input circuit 310, and an output port of the serial input circuit 310 is connected through a signal line 340 to the input port of the transfer control circuit. Further, the input and output ports of the transfer control circuit 312 is also connected to a bus 342.

In addition to the transfer control circuit 312, an input and output port of a fault monitoring circuit 322 for monitoring data in a central processing unit (CPU) 320, a read only memory (ROM) 314, a random access memory (RAM) 316 and on the bus 342, and for detecting the fault such as a noise on the bus 342 and a break in the bus, and an input and output port of an output control circuit 324 for producing and outputting a control pulse for a power converter 102 are connected to the bus 342. The output port of the fault monitoring circuit 322 is also connected through a signal line 346 to an input port of the CPU 320. The input port of the output control circuit 324 is also connected through a signal line 344 to an output port of a synchronous control circuit 318 for generating an operation starting signal for an AD module 121. The output port of the synchronous control circuit is connected to a signal line 181. Further, the output port of the synchronous control circuit is also connected to signal lines 191, 171, 176 and 344, and its input port is also connected to signal lines 173 and 175.

The operation of the arithmetic module 131 will be explained next.

When the serial input circuits 302, 306 and 310 receive serial data from the signal lines 163, 151 and 165, they convert the received serial data into parallel data, and output the parallel data, respectively, through the signal lines 332, 336 and 340 to the transfer control circuit 312.

When the serial output circuits 304 and 308 receive parallel data from the transfer control circuit 312 via the signal lines 334 and 338, they convert the received parallel data into serial data, and output the serial data onto the signal lines 161 and 166.

When the transfer control circuit 312 receives parallel data from the serial input circuits 302, 306 and 310 via the signal lines 332, 336 and 340, it temporarily stores the parallel data in an internal memory. Further, when the transfer control circuit 312 receives a data read-out request from the CPU 320 via the bus 342, it outputs the data stored in the memory to the CPU 320 via 342. Further, when the transfer control circuit receives data from the CPU 320 via the bus 342, it stores the data in the internal memory. Furthermore, after the transfer control circuit temporarily stores the data received from the serial input circuit 306 or the CPU 320, it outputs the stored data to the serial output circuits 304 and 308 via the signal line 334 and 338.

The CPU 320 receives through the transfer control circuit 312 the data from three AD modules 121, 122 and 123 at a predetermined period, via the bus 342, produces data for controlling the power converter 102 by selecting data of a normal AD module, and transmit the produced data to the output control circuit 324 via the bus 342. Further, when it is necessary to transfer data to other arithmetic modules 132 and 133, the CPU transfers the necessary data to the transfer control circuit 312 via the bus 342.

0035

The fault monitoring circuit 322 monitors the data on the bus 342, and outputs an initialization signal to the CPU 320 via the signal line 346 when the fault is detected. The detection of faults is performed by supplying signals for checking errors such as parity onto the bus, and detecting the abnormality of data. It may use a method in which a program for performing the sum check of the ROM 314, the read/write check of the RAM 316, etc. and for informing the fault monitoring circuit 322 of an error via the bus 342 when the error is detected.

The synchronous control circuit 318 receives and transmits synchronizing signals from and to the arithmetic modules 132 and 133 via the signal lines 171, 175, and 176, 173, respectively, produces an operation starting signal for the AD conversion and outputs it onto a signal line 191. At the same time, the synchronous control circuit counts the time elapsed after the operation starting signal becomes a logical level 1, and outputs the count value to the output control circuit 324 via the signal line 344.

The output control 324 produces a control pulse for the power converter 102 based on the control data received from the CPU 320 via the bus 342 and time information received from the synchronous control circuit 318 via the signal line 344, and outputs the control pulse onto the signal line 181.

The arithmetic modules 132 and 133 have the same configuration as the arithmetic module 131, and operate in the same way.

Figure 5:
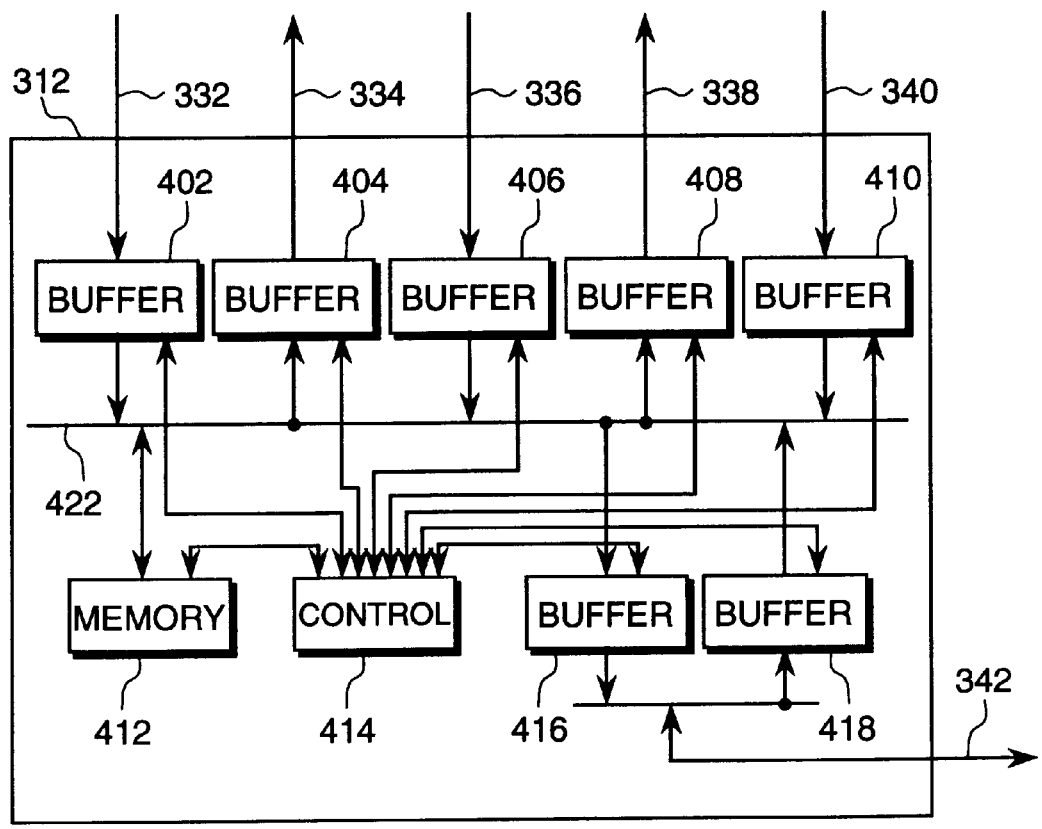
FIG. 5 is a block diagram showing concrete configuration of a transfer control circuit 312 shown in FIG. 4.

FIG. 5 is a block diagram showing concrete configuration of a transfer control circuit 312 shown in FIG. 4.

In FIG. 5, the signal lines 332, 336 and 340 are connected to input ports of buffers 402, 406 and 410, respectively. Output ports of the buffers 402, 406 and 410 are connected to a bus 422. Input ports of buffers 404 and 408 are connected to a bus 422, and output ports of the buffers 404 and 408 are connected to signal lines 334 and 338, respectively. To the bus 422, an input port of a buffer 416, an output port of a buffer 418 and input/output ports of a memory 412 are also connected. An output port of the buffer 416 and an input port of the buffer 418 is connected to a bus 342. An input/output ports of a control circuit 414 for reading-out and transmitting data stored in the memory 412 are connected to each of input/output ports of the buffers 402, 404, 406, 408, 410, 416 and 418.

The operation of the transfer control circuit 312 will be explained next.

When the buffers 402, 406 and 410 receive data via the signal lines 332, 336 and 340, they output a write request for the memory 412 to the control circuit 414. When the buffers receive a signal indicative of "Ready" from the control circuit 414, they output the data received via the signal lines 332, 336 and 340 to the bus 422. The data which the buffers 402, 406 and 410 output onto the bus 422 is received by the memory 412, and stored in the memory.

When the buffers 404 and 408 receive a data fetching request from the control circuit 414, they output, respectively, onto the signal lines 334 and 338. The data which the buffers 404 and 408 fetch is the data output from memory 412 to the bus 422.

When the memory 412 receives a data reading-out command from the control circuit 414, it outputs the designated data onto the bus 422. Further, when the memory receives a data writing command from the control circuit 414, it fetches the data from the bus 422, and stores it in the designated location.

When the buffer 416 receives a data reading-out command via the bus 342, it outputs a data read-out request to the control circuit 414. When the buffer receives the signal indicative of "Ready", it fetches the data which the memory 412 output onto the bus 422, and outputs it onto the bus 342.

When the buffer 418 receives a data writing command from the bus 342, it fetches the data appearing on the bus 342, and outputs a writing request to the memory to the control circuit 414. Further, when the buffer receives the signal indicative of "Ready" from the control circuit 414, it outputs the data fetched from the bus 342 onto the bus 422. The data which the buffer 418 output to the bus 422 is fetched in the memory 412, and stored in the memory.

Figure 6:
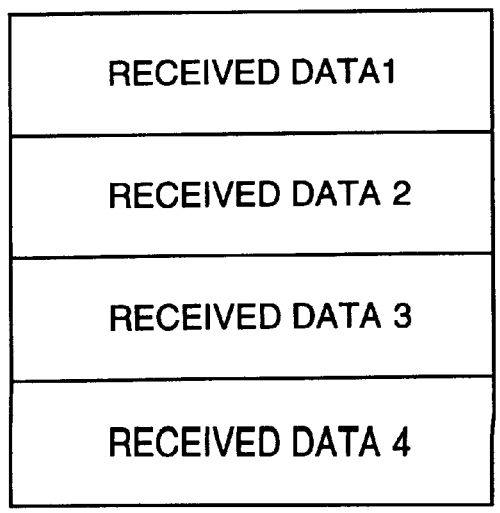
FIG. 6 is a view showing the arrangement of data on memory 412 shown in FIG. 5.

FIG. 6 is a view showing the arrangement of data on memory 412 shown in FIG. 5. The memory 412 is divided into four areas, received data 1 to 3 and transmission data 1.

In the areas for the received data 1 and 3, the data from the buffers 402 and 410 are written respectively. The written data is read out at a read-out request from the buffer 416.

In the area for the received data 2, the data from the buffer 406 is written. At the same time as the completion of writing, the data is output to the buffers 404 and 408. Further, the data is read out at a read-out request from the buffer 416.

In the area for the transmission data 1, the data from the buffer 418 is written. At the same time as the completion of writing, the data is output to the buffers 404 and 408.

Figure 7:
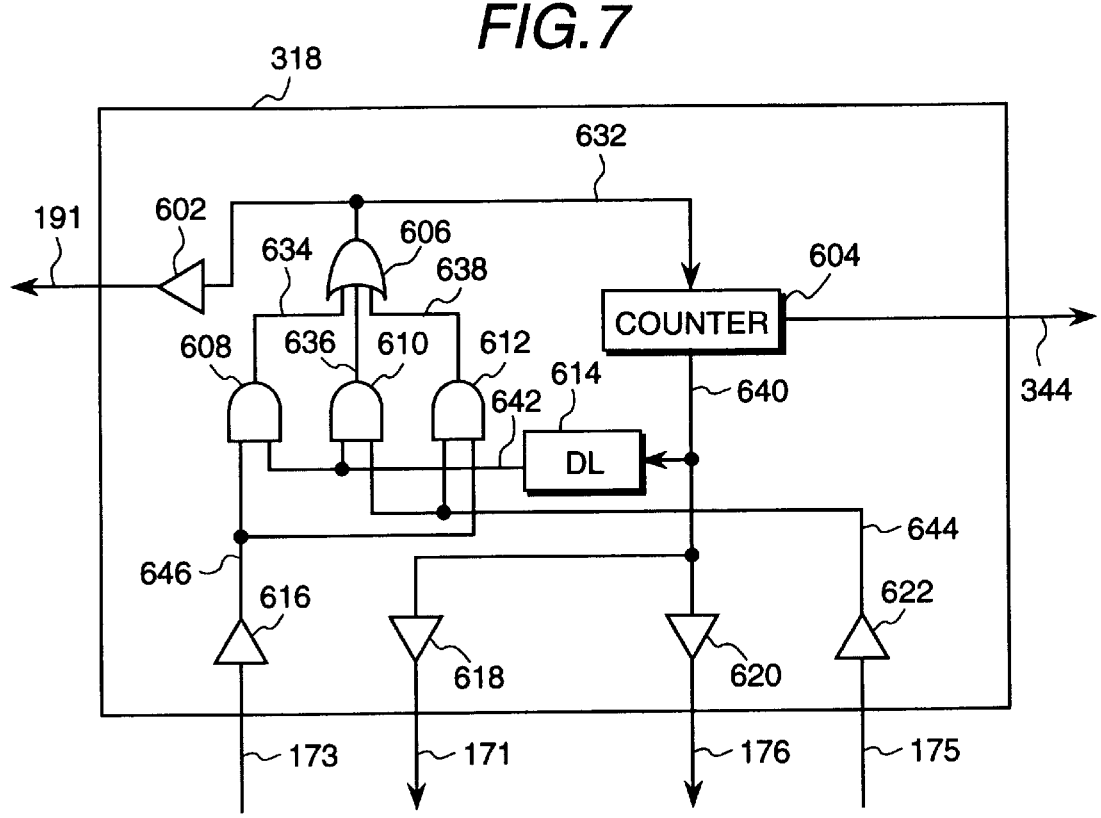
FIG. 7 is a block diagram showing the concrete configuration of an synchronous control circuit 318 shown in FIG. 4.

FIG. 7 is a block diagram showing the concrete configuration of an synchronous control circuit 318 shown in FIG. 4.

In FIG. 7, a signal line 173 is connected to an input terminal of a buffer 616. An output terminal of the buffer 616 is connected to one input terminal of each of AND gates 608 and 612 via a signal line 646. A signal line 175 is connected to an input terminal of a buffer 622. An output terminal of the buffer 622 is connected to the other input terminal of the AND gate 612 and one input terminal of an AND gate 610 via a signal line 644. The other input terminal of each of the AND gates 608 and 610 is connected to an output terminal of a delay circuit (DL circuit) for delaying a received signal and outputting the delayed signal via a signal line 642. Further, output terminals of the AND gates 608, 610 and 612 are connected to each of input terminals of a three-input OR gate 606. An output terminal of the OR gate 606 is connected to a reset terminal of a counter 604 and an input terminal of the buffer 602 via a signal line 632. An output terminal of the buffer 602 is connected to a signal line 191. An output terminal for the count value of the counter 604 is connected to the signal line 344 and its carry terminal for outputting a count termination signal is connected to each of input terminals of buffers 618, 620 and the DL circuit 614 via a signal line 640. Output terminals of buffer 618 and 620 is, respectively, connected to signal lines 171 and 176.

The operation of the synchronous control circuit 318 will be explained next.

The counter 604 increases its count value one by one every predetermined time, and outputs its count value onto the signal line 344. Further, when the counter receives the operation starting signal from the OR circuit 606 via a signal line 632, it clears its count value to be 0. When the count value becomes equal to the predetermined value, the counter fixes its count value, and outputs the count termination signal onto a signal line 640.

when the DL circuit 614 receives the count termination signal from the counter 604 via the signal line 640, it delays the count termination signal by a predetermined time, and then outputs the delayed signal to a signal line 642. The DL circuit 614 is adapted to delay the count termination signal of the arithmetic module 131 by the time required to transfer the counter terminating signal between other arithmetic modules 132 and 133.

The buffers 616 and 622 receive the count termination signal from the arithmetic modules 133 and 132 via signal lines 173 and 175, and outputs to the signal lines 646 and 644, respectively. The buffers 618 and 620 receive the count termination signal from the counter 604 via a signal line 640, and outputs to the signal lines 171 and 176, respectively.

Three AND circuits 608, 610 and 612, and an OR circuit 606 form a two-out-of-three voter as a whole. Namely, if more than two of the values of signal lines 642, 644 and 646, or more than two of the values of the count termination signals from three arithmetic modules 131, 132 and 133, are at the logical level 1, the voter outputs a signal indicative of the logical level 1 to a signal line 632, otherwise, it outputs a signal indicative of the logical level 0 to the signal line 632. The signal indicative of the logical level 1 output from the two-out-of-three voter is input to the AD module 121 via the buffer 602 and a signal line 191.

Figure 8:
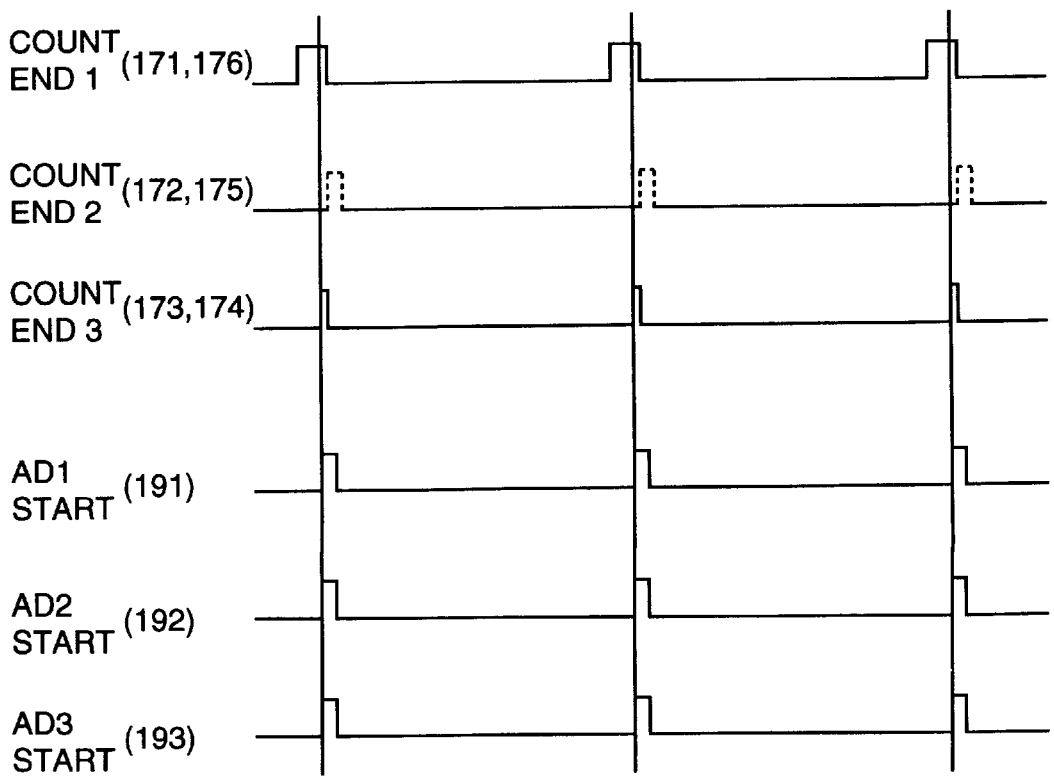
FIG. 8 is a timing chart illustrating the operation of the synchronous control circuit 318 shown in FIG. 4.

FIG. 8 is a timing chart illustrating the operation of the synchronous control circuit 318 shown in FIG. 4.

In the counters of the individual arithmetic modules 131 to 133, the count value is made to be incremented one by one in a definite period of time, and the count termination signal is put out when the count value reach a predefined value. As the definite period of time with which the count value is incremented varies from module to module, the output timing of the count termination signal varies from module to module. In this embodiment, it assumed that the output of the count termination signal from the arithmetic module 131 comes out first and that the output of the count termination signal from the arithmetic module 132 comes out last. The synchronous control circuits of the individual arithmetic modules make the logical level of the transfer initiating signal 1 when the count termination signals of any two arithmetic modules turn to the logical level 1. Therefore, in this example, the transfer initiating signals to all the AD modules 121 to 123 is turned to the logical level 1 when the count termination signal of the arithmetic module 132 becomes the logical level 1, and thus, it is enabled to transfer the analog signal to the digital signal at an identical timing at all the AD modules 121 to 123. When the count termination signal, that is, transfer initiating signal becomes the logical level 1, as the counter of the individual arithmetic modules is reset, the count termination signal also turns to the logical level 0. In this example, as the counter of the arithmetic module 132 is reset before its count termination signal becomes the logical level 1, its count termination signal is maintained to be the logical level 0 at all times.

Figure 9:
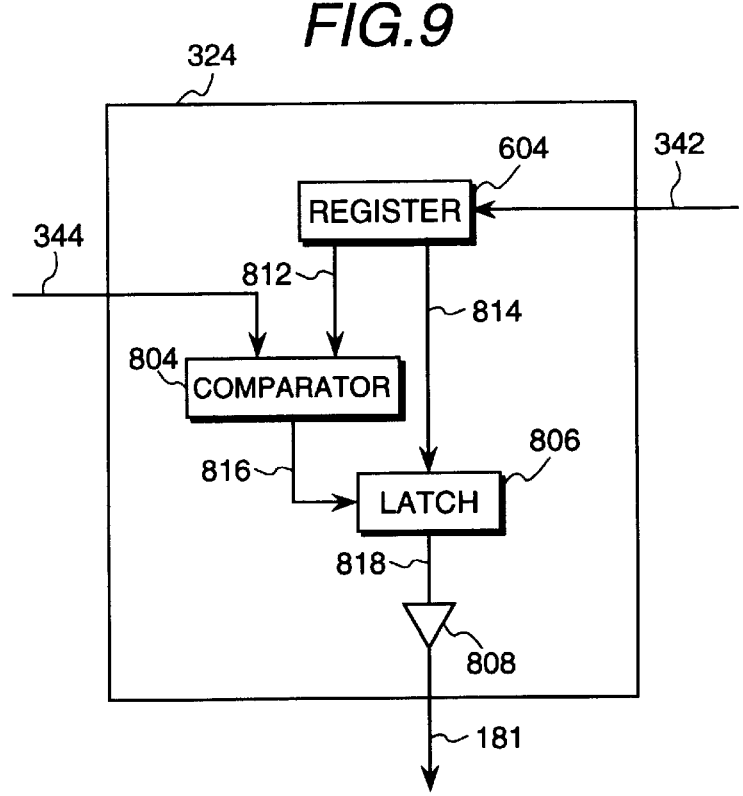
FIG. 9 is a block diagram showing the concrete configuration of an output control circuit 324 shown in FIG. 4.

FIG. 9 is a block diagram showing a specific structure of the output control circuit 324 of the arithmetic module 131 shown in FIG. 4.

In FIG. 9, the signal line 344 is connected to one of the input terminals of the comparator 804, and the other input terminal is connected to the output port of the register 802 through the signal line 812. The output terminal of the comparator 804 is connected to the trigger signal input terminal of the latch circuit 809 through the signal line 816, and the output terminal of the latch circuit 806 is connected to the input terminal of the buffer 808 through the signal line 818. The input port of the register 802 is connected to the bus 342 and the output terminal of the buffer 808 is connected to the signal line 181.

Next, the operation of the output control circuit 324 is described.

The register 802 receives and stores the data for power converter control supplied from CPU 320 through the bus 342, and outputs to the comparator 804 and the latch circuit 806 through the signal lines 812 and 814, respectively. The data for power converter control comprise the information on the relative time to the reference time in a single control period for the rise-up or fall operation of the control pulse and the information judging whether the control pulse is selected to be the logical level 0 or the logical level 1 when the relative time for the designated operation is elapsed.

The comparator compares the count value received from the synchronous control circuit 318 through the signal line 344 with the information on the relative time received from the register through the signal line 812, in which the output level of the signal line 816 is made to be the logical level 1 if both agree with each other, and which the output level of the signal line 816 is made to be the logical level 0 if not so.

The latch circuit 806 changes the output level of the signal line 818 according to the timing when the output level of the signal line 816 of the comparator 804 turns to the logical level 1. The output level so changed is identical to the signal level supplied from the register 802 through the signal line 814.

The buffer 808 supplies the output signal of the latch circuit 806 onto the signal line 181.

Thus, the control pulse for controlling the switching operation of the power converter 102 is set to be the signal level directed by CPU 320 at the timing when CPU 320 specifies.

Figure 10:
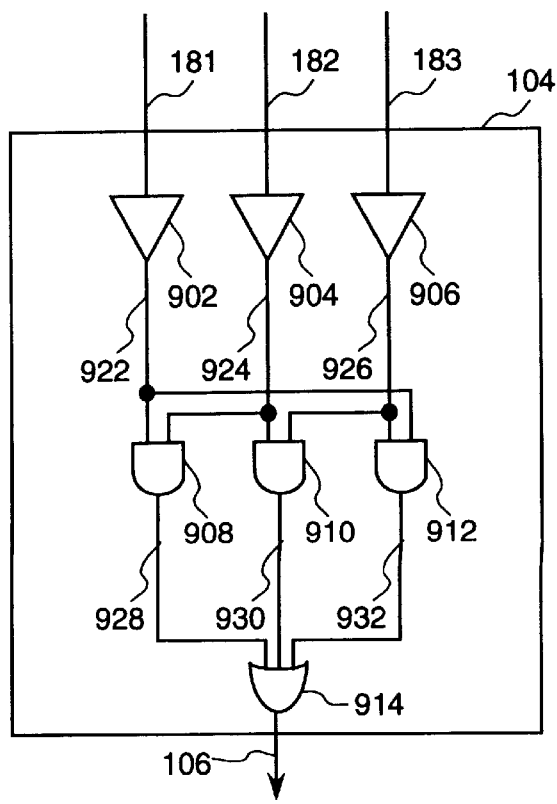
FIG. 10 is a block diagram showing the concrete configuration of a two-out-of-three voter 104 shown in FIG. 1.

FIG. 10 is a block diagram showing a specific structure of the majority decision circuit 104 in the power converter control apparatus shown in FIG. 1.

In FIG. 10, the signal lines 181, 182 and 183 are connected to the input terminals of the buffers 902, 904 and 906, respectively. The output terminal of the buffer 902 is connected to one of the input terminals of AND gates 908 and 912, respectively, through the signal line 922. The output terminal of the buffer 904 is connected to the other of the input terminals of AND gate 908 and one of the input terminals of AND gate 910, respectively. The output terminal of the buffer 906 is the other of the input terminals of AND gates 910 and 912, respectively. The output terminals of AND gates 908, 910 and 912 are connected to the input terminals of the three-input OR gate 914, respectively, and the output terminal of OR gate 914 is connected to the signal line 106.

Next, the operation of the majority decision circuit 104 is described.

The buffers 902, 904 and 906 receive the control pulses through the signal lines 181, 182 and 183, respectively, and supply the received control pulses onto the signal lines 922, 924 and 926, respectively.

The majority decision operation is established by combining AND circuits 908, 910 and 912 and OR circuit 914. When 2 or more control signals on the signal lines 922, 924 and 926 have the logical level 1, the control pulse on the signal line 106 is decided to be also the logical level 1, and when 2 or more control signals have the logical level 0, the control pulse on the signal line 106 is decided to be also the logical level 0.

Figure 11:
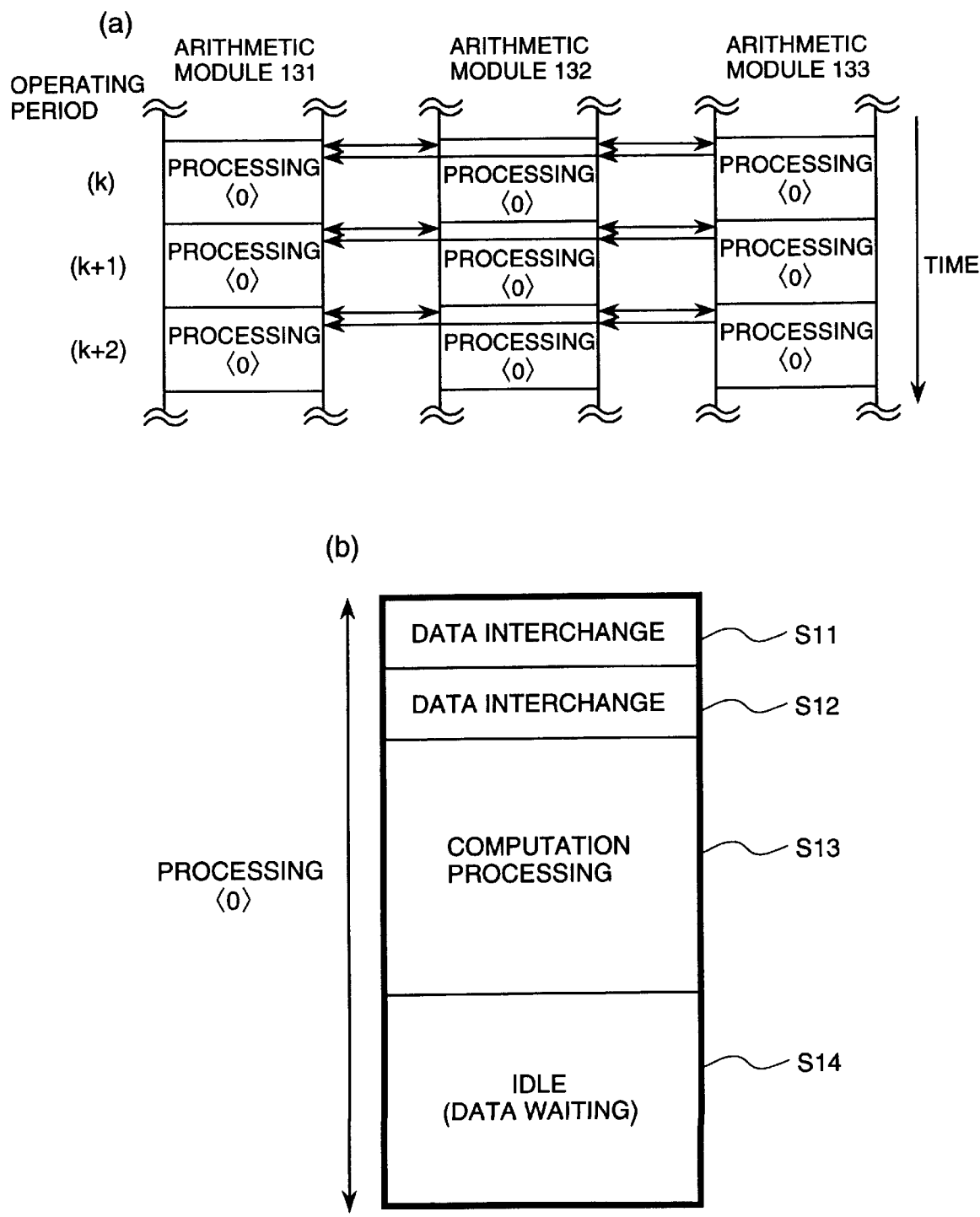
FIG. 11a & FIG. 11b , is flowchart of the processing during a normal operation of the arithmetic module of the control apparatus of the power converter shown in FIG. 1.

FIG. 11 shows a processing flow of the normal operation in the arithmetic modules 131, 132 and 133 of the power converter control apparatus shown in FIG. 1.

FIG. 11a is a processing flow in the arithmetic modules 131, 132 and 133. The arithmetic modules 131, 132 and 133 repeat an identical operation in a definite period of time. The arithmetic modules 131, 132 and 133 execute the processing <0> at the individual processing periods, k, k+1, k+2, and so on. The initiating timings for the arithmetic operations executed periodically at the individual arithmetic modules 131, 132 and 133 are synchronized, and the data supplied initially from AD modules at the beginning of every operating period are interchanged mutually among them.

FIG. 11b is a flowchart showing the processing flow in a single arithmetic modules in a single processing period. At first, the arithmetic module interchanges the data supplied from AD modules at the beginning of the operating period mutually with another arithmetic modules in step S11, and next, the valid data are selected in step S12, and then the computation processing is executed with the selected data in step S13. After completing the computation processing, the arithmetic module is moved in an idle state for waiting for the next data to be transferred.

Figure 12:
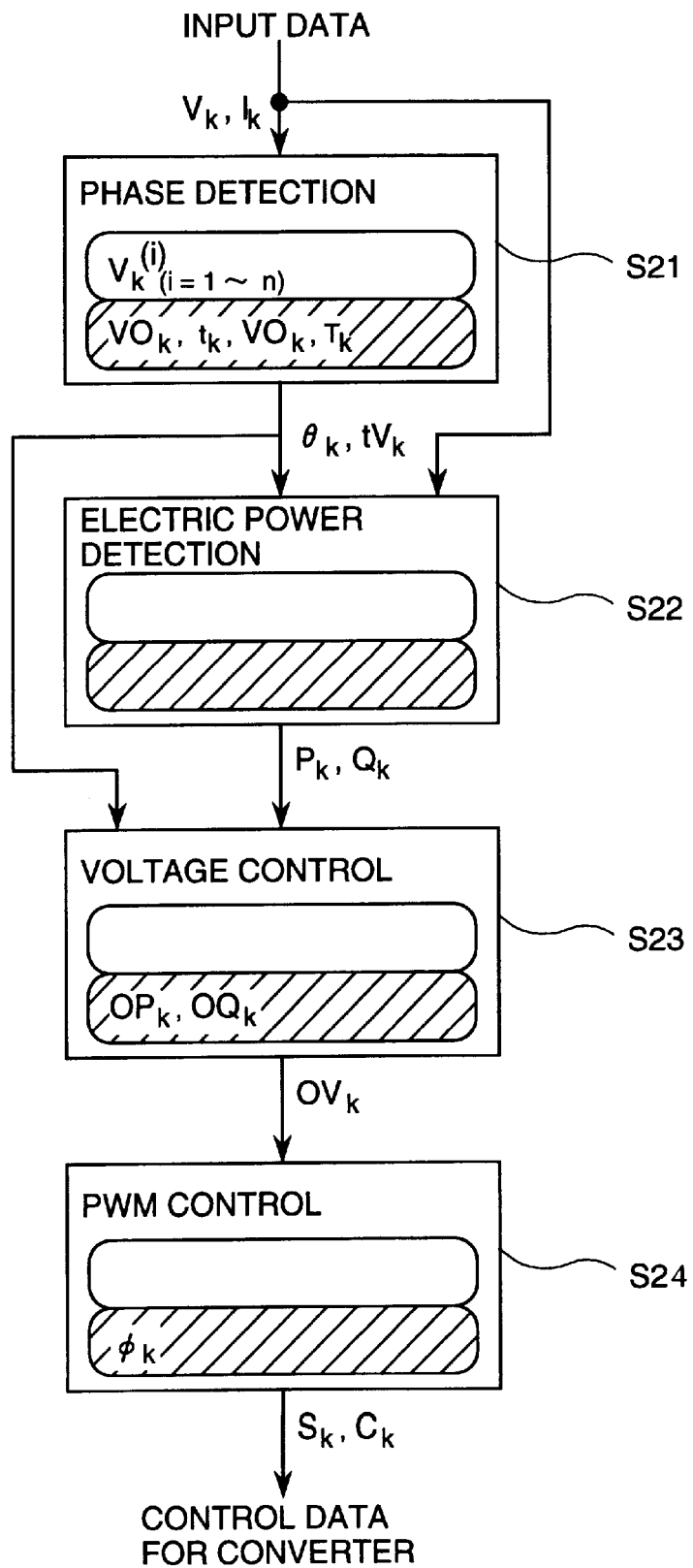
FIG. 12 is a flowchart showing the flow of data in computation processing shown in FIG. 11B.

FIG. 12 is a flowchart showing a specific data processing in the computation processing step (step S13) shown in FIG. 11B. The computation processing step (step S13) is composed of four processing steps; phase detecting step (step S21), power detecting step (step S22), voltage controlling step (step S23) and PWM controlling step (step S24). In the following description for the individual processing steps, the alphabetical symbols with subscript "k" represent variables with their values to be calculated in the k-th operating period, and the alphabetical symbols with subscript "k−1" represent variables with the values calculated already in the (k−1)th operating period.

Figures 13, 15, 16:
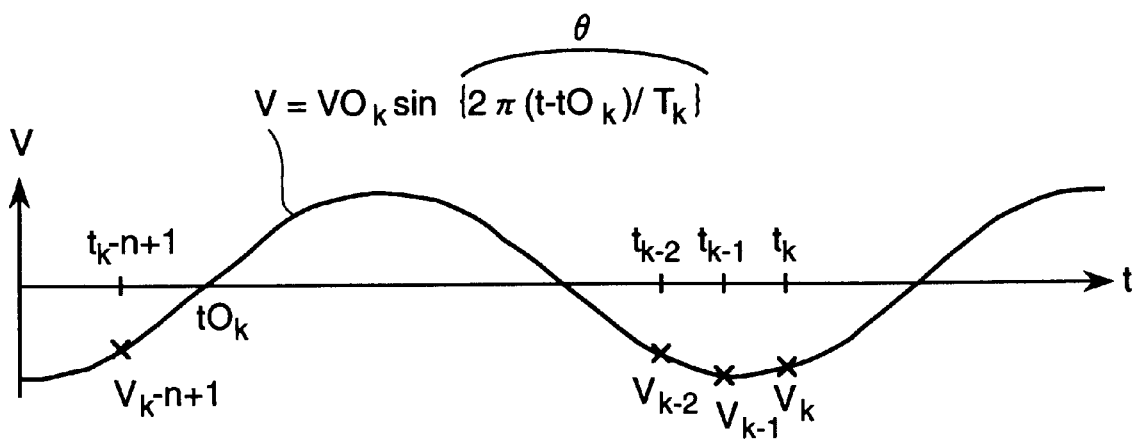
FIG. 13 is a schematic view of the processing in a PWM control step shown in FIG. 12.
FIG. 15 is a view showing an example of the concrete processing of a power detecting step shown in FIG. 12.
FIG. 16 is a view showing an example of concrete processing of a voltage controlling step shown in FIG. 12.

As shown in FIG. 13, the phase detecting processing step (step 21) is aimed for a processing in which the time varied profile of the voltage value V in the data from the AD module is approximated in a single sine curve and the phase q at the individual time period is calculated.

FIG. 14 is an example of specific procedures for the phase detecting processing for calculating the phase q shown in FIG. 13. In FIG. 14, the procedure in line No. 1 is to increment the time t by the operating period. The procedures in lines No. 2 to 5 are for storing the input data of past n-processing periods into the variable V(I), in which I is an arbitrary natural number. The procedures in lines No. 7 to 22 are for calculating the amplitude of the approximated sine curve. In the procedure of line No. 9, the summation d0 of the difference between the sine curve and the input data is obtained, assuming that the amplitude V0 is the amplitude in the previous processing period. In the procedure in line No. 11, the summation dp of the difference between the sine curve and the input data is obtained, assuming that the amplitude V0 is the sum of the amplitude in the previous processing period and the increment DV. In the procedure in line No.13, the summation dm of the difference between the sine curve and the input data is obtained assuming that the amplitude V0 is the difference between the amplitude in the previous processing period and the increment DV. The procedures in lines No. 15 to 22, the minimum of the summations d0, dp and dm is obtained, and its corresponding amplitude V0 is determined to be the final value.

The procedures in lines 24 to 25 are for estimating the time t0 when the approximated sine curve crosses the vertical axis (time axis) in FIG. 13. Those procedures are identical to those in lines No. 9 to 22 for obtaining the amplitude V0.

The procedures in lines 27 to 28 are for estimating of the period T of the approximated sine curve. Those procedures are identical to those in lines No. 9 to 22 for obtaining the amplitude V0.

The procedures in lines 30 to 34 are for subtracting 2p from the phase q when the phase q exceeds 2p and for setting the flag variable tv indicating that the phase q exceeds 2p in the arithmetic module.

The procedure in line No.35 is for obtaining the phase q.

As described above, the phase detecting processing depends only upon the input data and the internal data, but does not depend upon the processing results of the power detecting, voltage controlling and PWM controlling steps.

FIG. 15 is an example of specific procedures for the power detecting step (step S22) shown in FIG. 12. In FIG. 15, P represents an power component having a phase identical to that of the voltage V, and Q represents a phase component shifted by 90 degree from the voltage V.

As apparent from FIG. 15, the power detecting step (step S22) depends on the input data, the processing results of the phase detecting step (step S21) and the internal data, but does not depend on the processing results of the voltage controlling step (step S23) and the PWM controlling step (step S24).

FIG. 16 is an example of specific procedures for the voltage controlling step (step S23) shown in FIG. 12. In FIG. 16, OP is a voltage component of the expected value OV of the output voltage having an identical phase to the voltage V, and OQ is a voltage component of the expected value OV of the output voltage having a phase shifted from the voltage V by 90 degree. The calculation for the output voltage components OP and OQ is initiated only when the flag signal tv indicating that the phase q exceeds 2p turns to 1. The correction value obtained as the product of the gain gp and the difference between the power P and its expected value PI is added onto the output voltage component OP. The correction value obtained as the product of the gain gq and the difference between the power Q and its expected value QI is added onto the output voltage component OQ. The expected value OV of the output voltage is calculated as the sum of the product of the output voltage component OP and the sine of the phase q and the product of the output voltage OQ and the cosine of the phase q.

As described above, the voltage controlling step (step S23) depends only upon the input data, the phase detecting step (step S21), the power detecting step (step S22) and the internal data, but does not depend upon the processing results of the PWM controlling steps.

Figures 17, 18:
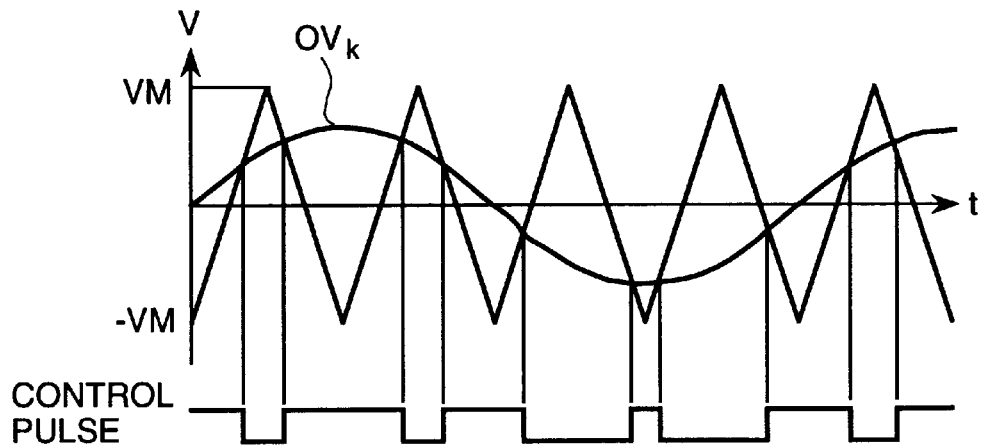
FIG. 17 is a view showing an example of the concrete processing of a PWM control step in FIG. 12.
FIG. 18 is a view showing an example of the concrete processing of the PWM control step shown in FIG. 12.

FIG. 17 is a schematic diagram showing the processing of the PWM controlling step (step S24). In the PWM controlling step (step S24), the comparison is performed between the reference triangular wave and the expected value OV of the output voltage, and then, the PWM control is so configured that the control pulse may turned on when the expected value OV exceeds the triangular wave, and that the control pulse may be turned off when the triangular wave exceeds the expected value OV.

FIG. 18 is an example of specific procedures in the PWM controlling step (step S24).

In FIG. 18, the procedures in lines 1 and 2 is for incrementing the variable f indicating the phase of the triangular wave. The variable f increases one by one at every processing phase, and varies between 0 and 2m−1, in which m is a normalized value by assuming that the time while the voltage value of the triangular wave changes from −VM to VM is 1 and the processing period is 1. This means that the voltage value of the triangular wave increases from −VM to VM between 0 and m, and that the voltage value decreases from VM to −VM between m and 2m.

The procedures in lines No. 3 to 12 is for obtaining the present voltage value of the triangular wave and the direction S of the change in the control pulse. As the control pulse changes from ON to OFF when the variable f is smaller than the phase m. the direction S of the change is set to be 0. On the other hand, as the control pulse changes from OFF to ON when the variable f exceeds the phase m. the direction S of the change is set to be 1.

The procedures in lines No. 13 to 18 is for obtaining the intersecting point between the triangular wave and the expected value OV of the output voltage. In case that the triangular wave and the expected value OV of the output voltage intersect each other within a next single processing period from the present time, the intersecting time is set to be C. The value C is defined by converting the relative time to the count value of the counter 604 which changes from 0 to CM in a single processing period. In case that the triangular wave and the expected value OV of the output voltage do not intersect each other in a single processing period, the value C is set to be larger than the maximum value CM so as to prevent the control pulse from changing.

As described above, the PWM controlling step (step S24) depends on the input data, the processing results of the phase detecting step (step S21), the power detecting step (step S22) and the voltage controlling step (step S23), and the internal data.

As described above, the individual processing steps in the power converter control apparatus can be decomposed from upstream to downstream in response to data dependency relation.

FIG. 19 is a scheme showing the specified computation processing shown in FIG. 12 and their corresponding fault effects.

FIG. 19A shows the fault effect in case that the fault occurs in the period (k−1) and the internal data V(n−1) in the phase detecting step (step S21) are damaged.

In the processing for the period (k), the computation result of V(n) dependent upon the value V(n−1) becomes invalid, but the value V(n−1) recovers to be valid. In addition, in the processing for the period (k+1), the computation result of V(n) becomes valid.

As shown above, even if the internal data V(1) to V(n) become invalid unfortunately, they can recover to be valid as far as the input data are guaranteed to be valid. Data such as the internal data V(1) to V(n) which once changed to be invalid but can be recovered to be valid during subsequent processing are called non-recursive data.

FIG. 19B shows the fault effect in case that the fault occurs in the period (k−1) and the internal data OP for the voltage control are damaged.

In the processing for the period (k), as the value of the internal data OP depend upon itself, its value remains to be invalid. This holds similarly in the processing after the period (k+1).

Thus, as the internal data OP depends on themselves, if they once turned into invalid ones, they can not be recovered to be valid any more. Such data which once changed to be invalid and can not be recovered are called recursive data. It is only recursive data that should be transferred from the normal system to the fault system when any fault occurs. It can be appreciated that the processing for transferring exclusively only the recursive data can be performed efficiently by means that the memory area for storing the recursive data and the memory area for storing the non-recursive data are defined separately.

FIG. 19C shows the fault effect in case that the fault occurs in the period (k−1) and the output data P for the power detection are damaged.

The computation results for all the data P, OP and V dependent upon the data P in the processing while the period (k) are invalid. This holds similarly in the processing after the period (k+1).

Thus, once the processing result of the power detection becomes invalid, the processing result of the voltage control becomes also invalid. Therefore, it is required to transfer the internal data at the upstream processing in advance when any faults occur and the data in the valid system are transferred to the invalid system.

Figure 20:
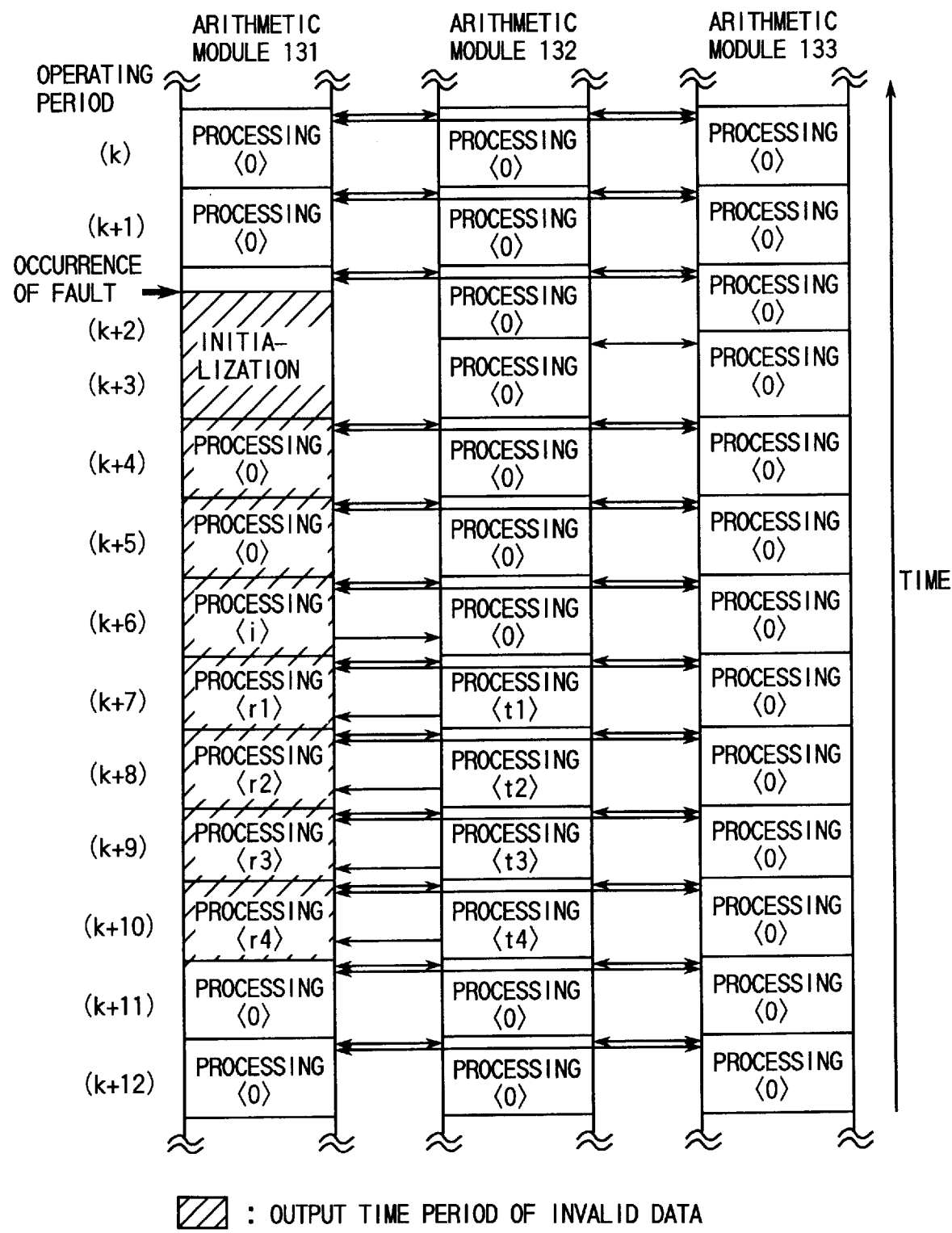
FIG. 20 is a view showing a first embodiment of a processing method performed when a fault is detected in an arithmetic module 131 of the control apparatus of the power converter shown in FIG. 1.

FIG. 20 is a view showing a first embodiment of a processing method performed when a fault is detected in an arithmetic module 131 of the control apparatus of the power converter shown in FIG. 1.

At an operating period (k+2), an arithmetic module 131 detects a fault, allow the CPU 320 to generate a reset signal, and starts the initialization processing of the control circuit and each element, in addition to control constants of registers in a control circuit, a RAM 316, and a memory 412. In the initialization processing, firstly, check of the hardware trouble by a self-diagnosis program and check of whether similar trouble had been detected within the past predetermined period of time are performed. If the hardware trouble is detected, or if similar trouble had been detected within the past predetermined period of time, it is determined that it is impossible to recover the fault, and the initialization processing is stopped. Otherwise, the initialization processing of the hardware such as the registers mentioned above is started.

At an operating period (k+3), because the arithmetic module 131 is during the initialization processing, it can not perform the interchange of the AD data between the arithmetic module and other arithmetic modules. Therefore, the arithmetic modules 132 and 133 select and processing normal data from two data except the data from the arithmetic module 131.

At operating periods (k+4) and (k+5), because the initialization processing is completed, normal processing (the processing <0>) is performed. By the processing during the two periods, non-recursive data among the internal data takes a valid value. However, recursive data is maintained to be invalid, and output data is also maintained to be invalid.

At an operating period (k+6), the arithmetic module 131 requests the arithmetic module 132 the start of transfer of the recursive data (the processing <i>) at the same time as the normal processing.

At an operating period (k+7), the arithmetic module 131 transfers the recursive data concerning the phase detecting step (step S21) shown in FIG. 12 from the arithmetic module 132 to the arithmetic module 131 (the processing <t1>, the processing <r1>) at the same time as the normal processing.

At an operating period (k+8), the arithmetic module 131 transfers the recursive data concerning the power detecting step (step S22) shown in FIG. 12 from the arithmetic module 132 to the arithmetic module 131 (the processing <t2>, the processing <r2>) at the same time as the normal processing. Because the arithmetic module 131 performs the processing by using the recursive data concerning the phase detecting step (step S21) received from the arithmetic module 132 at the operating period (k+7), all of the results of the phase detecting step (step S21) become valid values.

At an operating period (k+9), the arithmetic module 131 transfers the recursive data concerning the voltage control step (step S23) shown in FIG. 12 from the arithmetic module 132 to the arithmetic module 131 (the processing <t3>, the processing <r3>) at the same time as the normal processing. Because the arithmetic module 131 performs the processing by using the recursive data concerning the phase detecting step (step S21) and the power detecting step (step S22) received from the arithmetic module 132, respectively, at the operating periods (k+7) and (k+8), all of the results of the phase detecting step (step S21) and the power detecting step (step S22) become valid values.

At an operating period (k+10), the arithmetic module 131 transfers the recursive data concerning the PWM control step (step S24) shown in FIG. 12 from the arithmetic module 132 to the arithmetic module 131 (the processing <t4>, the processing <r4>) at the same time as the normal processing. Because the arithmetic module 131 performs the processing by using the recursive data concerning the phase detecting step (step S21), the power detecting step (step S22) and the voltage control step (step S23) received from the arithmetic module 132, respectively, at the operating periods (k+7), (k+8) and (k+9), all of the results of the phase detecting step (step S21), the power detecting step (step S22) and the voltage control step (step S23) become valid values.

At and after an operating period (k+11), the arithmetic module 131 performs normal processing (the processing <0>). Because the arithmetic module 131 performs the processing by using the recursive data concerning the phase detecting step (step S21), the power detecting step (step S22), the voltage control step (step S23) and the PWM control step (step S24) received from the arithmetic module 132, respectively, at the operating periods (k+7), (k+8), (k+9) and (k+10), all of the results of the phase detecting step (step S21), the power detecting step (step S22), the voltage control step (step S23) and the PWM control step (step S24) become valid values.

While during the operating periods (k+2) to (k+10), the arithmetic module 131 outputs invalid data, it is possible to operate normally the power converter 102 because the output data of the arithmetic modules 132 and 133 is selected by the two-out-of-three voter 104.

Like this, the non-recursive data V(i) can return a valid value during the processing is continued At an operating period (k+2). However, it does not always return at one operating period, and n operating periods at maximum are necessary to return the validive value. Accordingly, as shown in FIG. 20, the arithmetic module 131 must perform the normal processing <0> plural times (twice in case of the example shown in FIG. 20) before the transfer of the recursive data is started.

Figure 21:
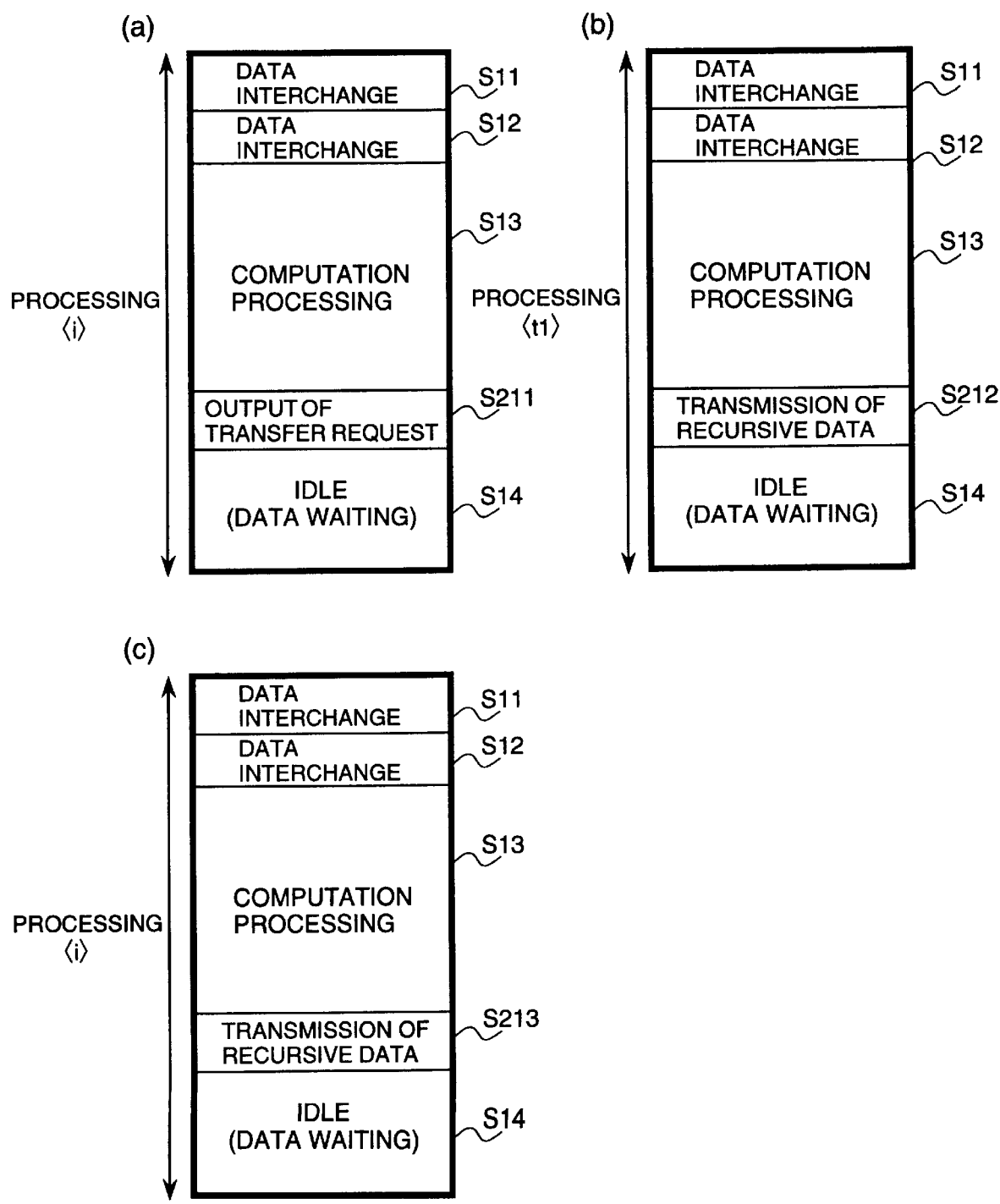
FIG. 21(a), FIG. 21(b), & FIG. 21(c) are views showing in detail of each of the processing shown in FIG. 20.

FIGS. 21A, 21B and 21C are views showing in detail of each of the processing shown in FIG. 20.

FIG. 21A shows the content of the processing of the arithmetic module 131 at the operating period (k+6) of FIG. 20. While the content of the processing is almost the same as that at the normal state shown in FIG. 11B (the data interchanging step S11, the data selecting step S12, the arithmetic processing step S13 and the idle step S14 are the same), it is different from that at the normal state in that there is provided a step (S12) of outputting a transfer request of the recursive data after the completion of the arithmetic processing step S13.

FIG. 21A shows the content of the processing of the arithmetic module 131 at the operating period (k+6) of FIG. 20. While the content of the processing is almost the same as that at the normal state shown in FIG. 11B also, it is different from that at the normal state in that there is provided a step (S212) of transmitting the recursive data after the completion of the arithmetic processing step S13.

FIG. 21A shows the content of the processing of the arithmetic module 131 at the operating period (k+6) of FIG. 20. While the content of the processing is almost the same as that at the normal state shown in FIG. 11B also, it is different from that at the normal state in that there is provided a step (S213) of receiving the recursive data after the completion of the arithmetic processing step S13.

Figure 22:
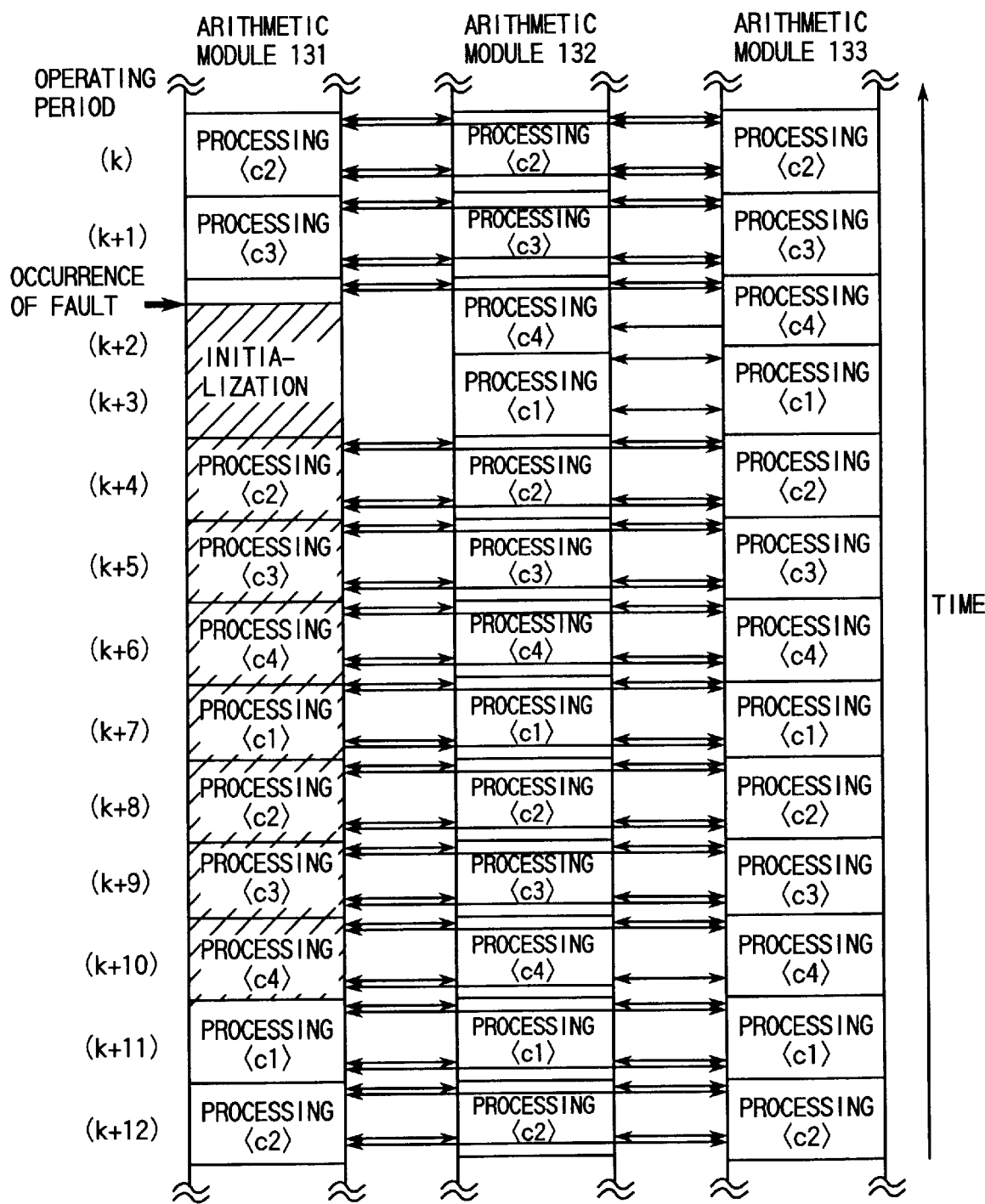
FIG. 22 is a view showing a second embodiment of a processing method performed when a fault is detected in an arithmetic module 131 of the control apparatus of the power converter shown in FIG. 1.

FIG. 22 is a view showing a second embodiment of a processing method performed when a fault is detected in an arithmetic module 131 of the control apparatus of the power converter shown in FIG. 1. The feature of this embodiment is in that the interchange of the recursive data in each of processing steps shown in FIG. 12 is carried out sequentially among three arithmetic modules not only when a fault is occurred, but when normal processing is performed.

At an operating period (k), all the arithmetic modules performs normally the processing (the processing <c2>). Further, the arithmetic module interchanges the recursive data in the power detecting step S22 during a vacant period of time after the completion of the processing, and checks the coincidence. Should the non-coincidence is detected, a value having the highest certainty of validness is selected and the processing is continued according to the procedure described later.

While the processing at an operating period (k+1) is performed in the same way as that at the operating period (k), it is different from that at the operating period (k) in that the recursive data is those in the voltage control step S23.

At an operating period (k+2), an arithmetic module 131 detects a fault, allow the CPU 320 to generate a reset signal, and starts the initialization processing of the control circuit and each element, in addition to control constants of registers in a control circuit 414, a RAM 316, and a memory 412.

The arithmetic module 131 can not perform the interchange of the data between the arithmetic module and other arithmetic modules. Therefore, the arithmetic modules 132 and 133 check the coincidence with respect to two recursive data except the recursive data from the arithmetic module 131.

Because at an operating period (k+3), the arithmetic module 131 is during the initialization processing, it can not perform the interchange of the data between the arithmetic module and other arithmetic modules. Therefore, the arithmetic modules 132 and 133 select and processing normal data from two data except the data from the arithmetic module 131. The coincidence of the recursive data is checked in the same way.

At an operating period (k+4), the same processing (<c2>) as that at the operating period (k) is performed, and thus the coincidence of the recursive data in the power detecting step S22 is checked. Thereby, the recursive data transferred from the arithmetic modules 132 and 133 are selected also in the arithmetic module 131, the recursive data in the power detecting step S22 becomes a valid value.

The processing at an operating period (k+5) is also the same as that at the operating period (k+4). Therefore, the recursive data in the voltage control step S23 becomes a valid value. While the recursive data in the power detecting step S22 once takes valid data at the operating period (k+4), the recursive data in the power detecting step S22 which depends on the value of the recursive data in the phase detecting step S21 becomes an invalid data after the completion of the processing of the operating period (k+5), because the recursive data in the phase detecting step S21 of the arithmetic module 131 is not at a valid value.

The processing at an operating period (k+6) is also the same as that at the operating period (k+5). Therefore, while the recursive data in the PWM control step S24 becomes a valid value, the recursive data in the voltage control step S23 becomes an invalid data after the completion of the processing.

The processing at an operating period (k+7) is also the same as that at the operating period (k+5). Therefore, while the recursive data in the phase detecting step S21 becomes a valid value, the recursive data in the PWM control step S24 becomes an invalid data after the completion of the processing.

The processing at an operating period (k+8) is also the same as that at the operating period (k+5). Further, the recursive data in the phase detecting step S21 is maintained to be a valid value even if after the completion of the processing, because it depends only upon the input data and the internal data in the phase detecting step S21.

The processing at an operating period (k+9) is also the same as that at the operating period (k+8). Therefore, the recursive data in the voltage control step S23 becomes a valid value, and the recursive data in the phase detecting step S21 and the power detecting step S22 also are maintained to be valid values.

The processing at an operating period (k+10) is also the same as that at the operating period (k+8). Therefore, the recursive data in the PWM control step S24 becomes a valid value, and the recursive data in the phase detecting step S21, the power detecting step S22 and the voltage control step S23 also are maintained to be valid values.

At and after an operating period (k+11), normal processing is performed. Results of the phase detecting step S21, the power detecting step S22, the voltage control step S23, and the PWM control step become valid values.

By setting the processing performed when the arithmetic module has a fault to be identical to the processing performed when it is normal, it is possible to simplify the scheme of software. Therefore, there is an effect that the faults of software is decreased. Further, because also at a normal state, the coincidence of the recursive data is checked, it becomes possible to processing normally by selecting the data having the highest certainty of validness, even if such a fault that can not find by a normal method is occurred and thus the non-coincidence of the recursive data is occurred.

Figure 23:
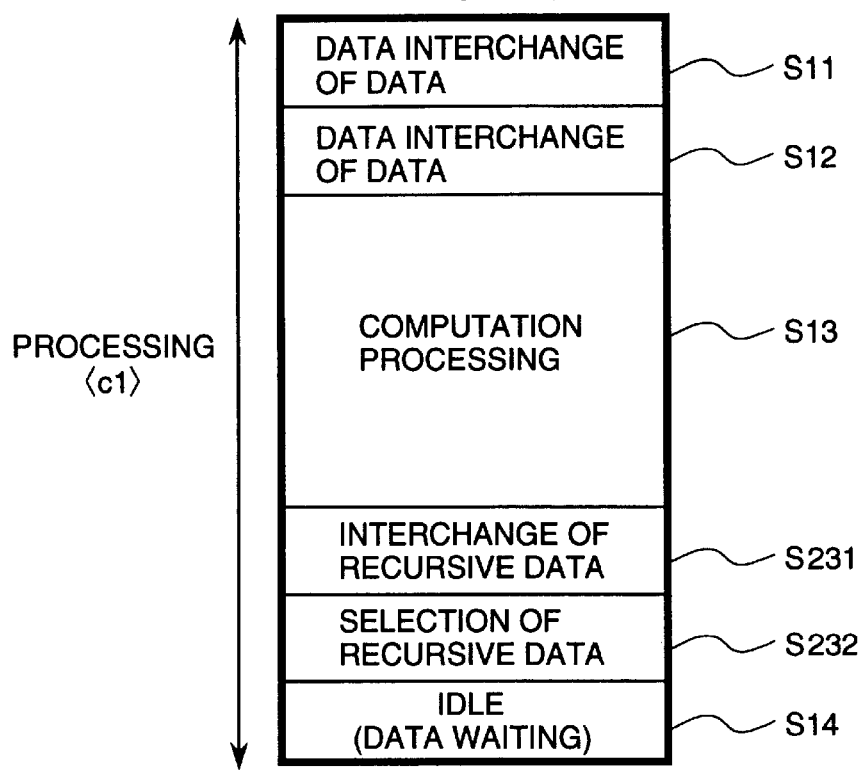
FIG. 23 is a view showing in detail each of the processing shown in FIG. 22.

FIG. 23 is a view showing in detail each of the processing (<c1> to <c4>) shown in FIG. 22. The content of the processing are basically the same as that of the processing <0> shown in FIG. 11B, except there are provided a recursive data interchanging step (step S231) and a recursive data selecting step (S232) after the arithmetic processing (step S13).

FIG. 24 is a flowchart showing the flow of the processing in a recursive data selecting step (S232) shown in FIG. 23. The operation of the recursive data selecting step will be explained with reference to the flowchart.

Firstly, a variable e indicative of an error code is initialized to be 0 (step S241).

Next, the recursive data D1 of the arithmetic module 131 and the recursive data D2 of the arithmetic module 132 are compared with each other (step S242). If both is not equal, 1 is added to the variable e (step S243).

Next, the recursive data D1 of the arithmetic module 131 and the recursive data D3 of the arithmetic module 133 are compared with each other (step S244). If both is not equal, 2 is added to the variable e (step S245).

Next, the recursive data D2 of the arithmetic module 132 and the recursive data D3 of the arithmetic module 133 are compared with each other (step S246). If both is not equal, 4 is added to the variable e (step S247).

Next, the value of the variable e is checked (step S248).

If the value of the variable e is 0, then all of the recursive data D1, D2 and D3 are normal, and thus any recursive data are selectable. Assumed that the recursive data D1 of the arithmetic module 131 is selected (step S249).

If the value of the variable e is 3, then the recursive data D1 of the arithmetic module 131 is abnormal, and the recursive data D2 and D3 of the arithmetic modules 132 and 133 are normal. In this case, either one of the recursive data D2 of the arithmetic module 132 and the recursive data D3 of the arithmetic module 133 is selectable. Assumed that the recursive data D2 of the arithmetic module 132 is selected (step S250).

If the value of the variable e is 5, then the recursive data D2 of the arithmetic module 132 is abnormal, and the recursive data D1 and D3 of the arithmetic modules 131 and 133 are normal. In this case, either one of the recursive data D1 of the arithmetic module 131 and the recursive data D3 of the arithmetic module 133 is selectable. Assumed that the recursive data D1 of the arithmetic module 131 is selected (step S251).

If the value of the variable e is 6, then the recursive data D3 of the arithmetic module 133 is abnormal, and the recursive data D1 and D2 of the arithmetic modules 131 and 132 are normal. In this case, either one of the recursive data D1 of the arithmetic module 131 and the recursive data D2 of the arithmetic module 132 is selectable. Assumed that the recursive data D1 of the arithmetic module 131 is selected (step S252).

If the value of the variable e is 7, then the recursive data of more than two arithmetic modules are abnormal. because in this case, it is impossible to determine which arithmetic module is normal, an average value of the recursive data D1, D2 and D3 of three arithmetic modules 131, 132 and 133 is selected (step S253).

The case in which the value of the variable e is 1, 2 or 4 is not occurred in principle.

Figure 25:
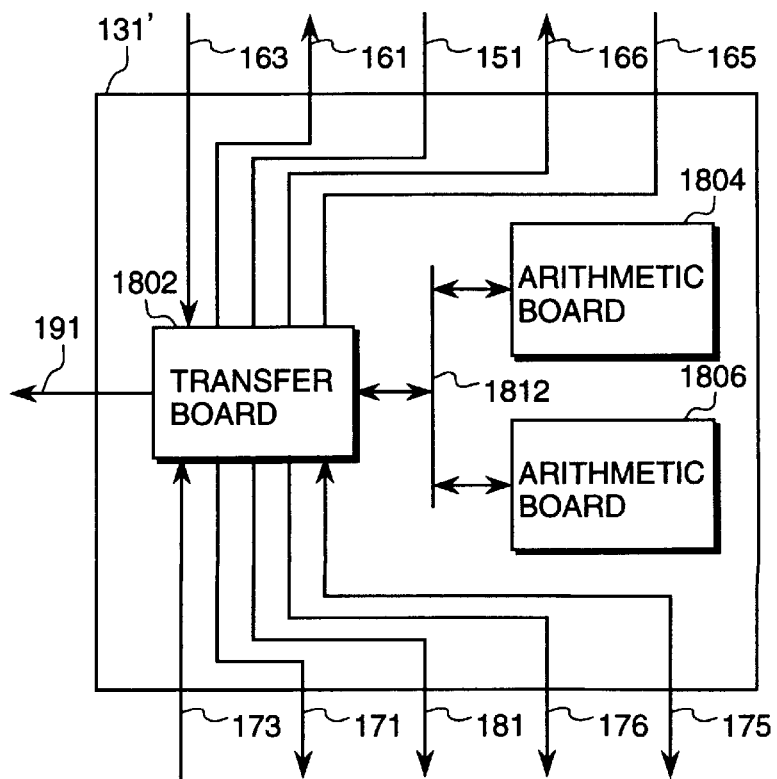
FIG. 25 is a block diagram showing a second embodiment of the concrete configuration of the arithmetic module 131 shown in FIG. 1.

FIG. 25 is a block diagram showing a second embodiment of the concrete configuration of the arithmetic module 131 shown in FIG. 1. The feature of this embodiment is in that there are a plurality of arithmetic boards.

The arithmetic module 131' comprises a transfer board 1802 for transferring a signal, and two arithmetic boards 1804, 1806 each for carrying out an arithmetic operation.

To an input ports of the transfer 1802, signal lines 163, 151, 165, 173, 175, and bus 1812 are connected. Input/output ports of the arithmetic boards 1804 and 1806 each are connected to the bus 1812.

The operation of the arithmetic module 131' will be explained next.

The transfer board 1802 transmits a synchronizing signal to the arithmetic modules 132', 133' (each has the same configuration as the arithmetic module 131') via the signal lines 171, 176, and receives a synchronizing signal from arithmetic modules 132', 133' via the signal lines 175, 173, respectively. The arithmetic module 131' produces a start signal to the AD module 121 on the basis of the synchronizing signal received through the signal lines 175, 173 and the synchronizing signal transmitted through 171, 176, and outputs the start signal to the signal line 191. Further, arithmetic module 131' receives the data from the AD module 121 via the signal line 151, and transmits the data received from the AD module 121 to the arithmetic modules 132', 133' via the signal lines 161, 166. In addition, it receives the data through the arithmetic modules 132', 133' from the AD modules 122, 123 via the signal lines 165, 163. When all of the data from three AD modules 121 to 123 are received, the occurrence of a fault in three AD modules is checked according to the algorithm shown in FIG. 2. The data from the AD module in which a fault is not occurred is selected, and the selected data is transferred to the arithmetic boards 1804 and 1806 via the bus 1812. Further, the transfer board receives control data from the arithmetic board 1804, produces a control pulse for the power converter 102, and outputs the control pulse to the signal line 181.

The arithmetic boards 1804 and 1806 receive data from the transfer board 1802 via the bus 1812, and perform the arithmetic operation, receiving and transmitting the intermediate results of the operation via the bus 1812.

Figure 26:
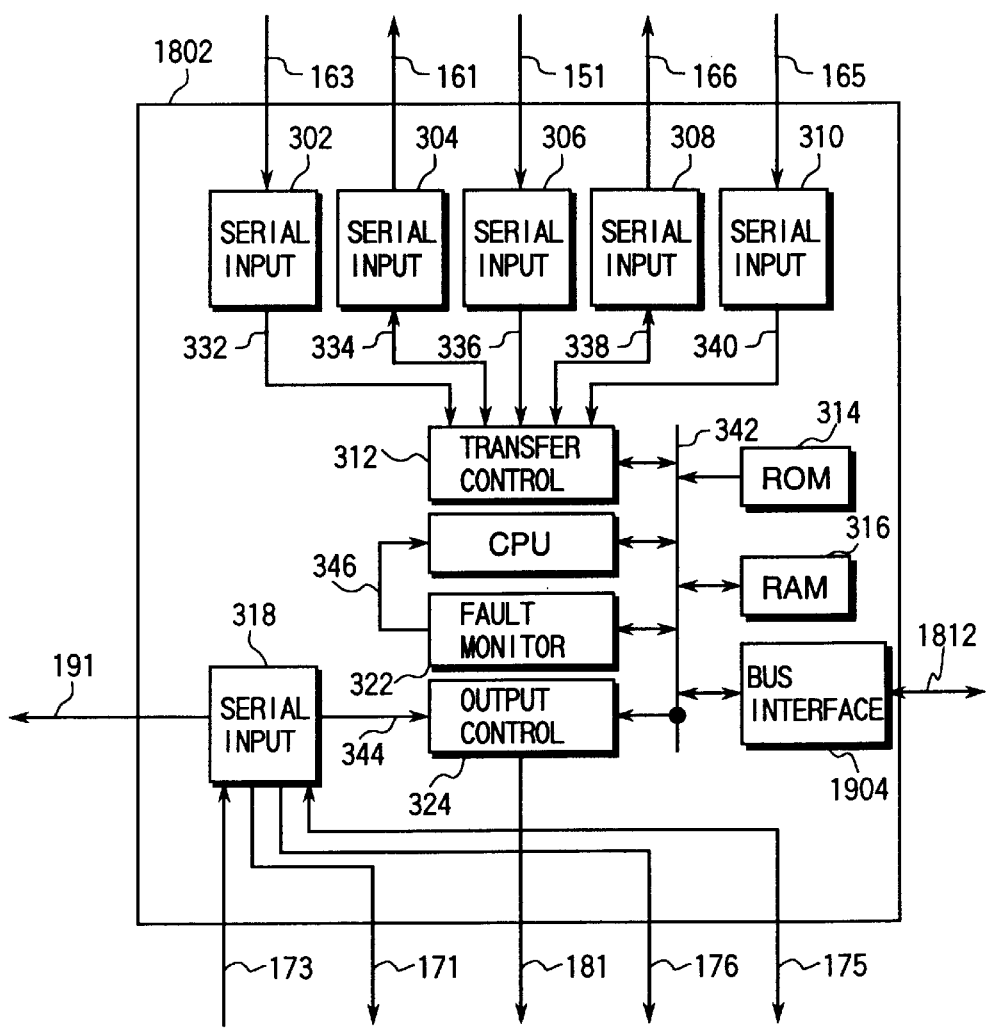
FIG. 26 is a block diagram showing the concrete configuration of a transfer board 1802 shown in FIG. 25.

FIG. 26 is a block diagram showing the concrete configuration of a transfer board 1802 shown in FIG. 25. The configuration of the transfer board 1802 is almost the same as that of the arithmetic module 131 shown in FIG. 4. However, there is a difference in configuration in that there is provided a bus interface 1904 for mediating and smoothing the reception and transmission of the signal between the buses 342 and 1812.

When the bus interface 1904 receives a data-write-signal from the CPU 320 via the bus 342, it outputs the received write request to the bus 1812. When the bus interface receive a signal indicative of "Ready" from the bus 1812, it outputs the writing data to the bus 1812. When the bus interface 1904 receives a data read-out request signal from the CPU 320, it outputs the received read request to the bus 1812. When the signal indicative of "Ready" from the bus 1812 is received, it fetches data from the bus 1812, and output the fetched data to the bus 342.

Figure 27:
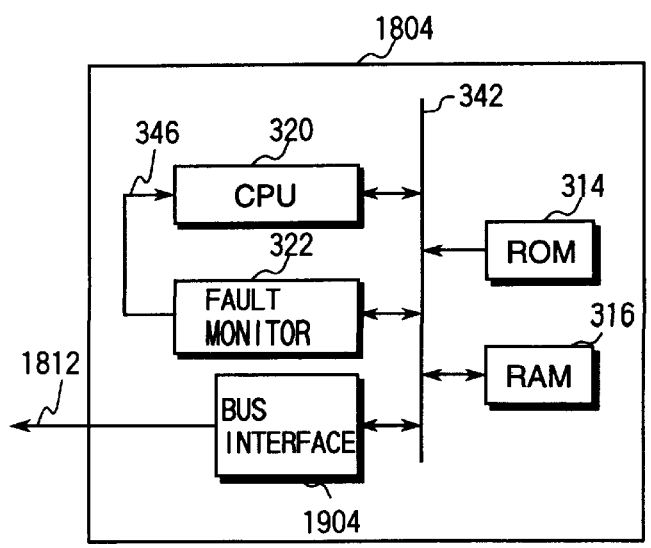
FIG. 27 is a block diagram showing the concrete configuration of an arithmetic board 1804 shown in FIG. 25.

FIG. 27 is a block diagram showing the concrete configuration of an arithmetic board 1804 shown in FIG. 25. The configuration of the arithmetic board 1804 is a subset of the configuration of the transfer board 1802 shown in FIG. 26. It is different from the transfer board 1802 in that there are not provided serial input circuits 302, 306, 310, serial output circuits 304, 308, a transfer control circuit 312, a synchronous control circuit 318, and output control circuit 324. Other components is the same as the transfer board 1802.

The configuration of the arithmetic board 1806 shown in FIG. 25 is also the same as the arithmetic board 1804.

FIG. 28 is a view showing the flow of data in the processing of the arithmetic boards 1804 and 1806 shown in FIG. 25. The whole processing of the arithmetic boards 1804 and 1806 is divided into five, processing 1 to processing 5. The arithmetic board 1804 performs the processing 1, 3 and 5, and the arithmetic board 1806 the processing 2 and 4. These processing 1 to 5 correspond to the processing such as the phase detection, the power detection, the voltage control, the PWM control, etc., shown in FIG. 12.

The processing 1 depends only upon input data and internal data, and does not depend upon the results of the processing 2 to 5.

The processing 2 depends only upon input data and internal data, and does not depend upon the results of the processing 1, 3, 4 and 5.

The processing 3 depends only upon input data, the results of the processing 1, 3, and internal data, and does not depend upon the results of the processing 4 and 5.

The processing 4 depends only upon input data, the results of the processing 1, 3, and internal data, and does not depend upon the results of the processing 3 and 5.

The processing 5 depends upon input data, the results of the processing 1, 2, 3, 4, and internal data.

FIG. 29 is a view showing the arrangement of data stored in a RAM 316 of the arithmetic boards 1804 and 1806 shown in FIG. 25.

The data on RAM 316 are categorized into input data, non-recursive data and recursive data, are arranged in the four separated regions; input data region R1, non-recursive data region R2, recursive data regions R31 to R35 and free area R4. Thus, by arranging the recursive data in a definite region, it will be appreciated that the transfer of recursive data between the arithmetic boards 1804 and 1806 and the transfer board 1802 can be performed efficiently.

Figure 30:
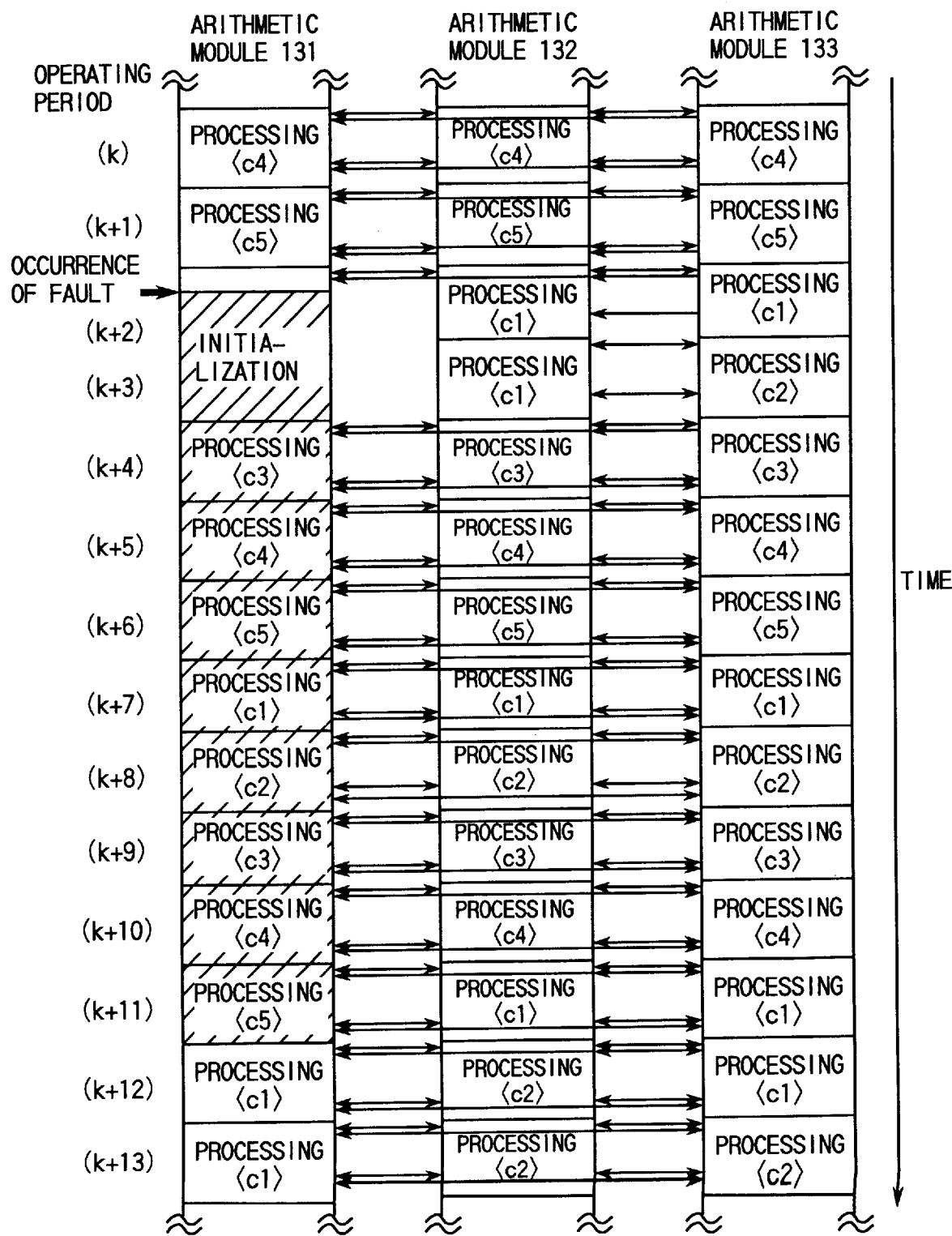
FIG. 30 is a view showing an example of a processing method performed when a fault is detected in an arithmetic module 131' of the control apparatus of the power converter shown in FIG. 1, in which the configuration shown in FIG. 25 is applied to the arithmetic module 131'.

FIG. 30 is a view showing an example of a processing method performed when a fault is detected in an arithmetic module 131' of the control apparatus of the power converter shown in FIG. 1, in which the configuration shown in FIG. 25 is applied to the arithmetic module 131'. The processing scheme shown in FIG. 30 is almost similar to that shown in FIG. 22, only except that the occurrence for consistency check of the recursive data increases from four units of processing period to five units of processing period.

Figure 31:
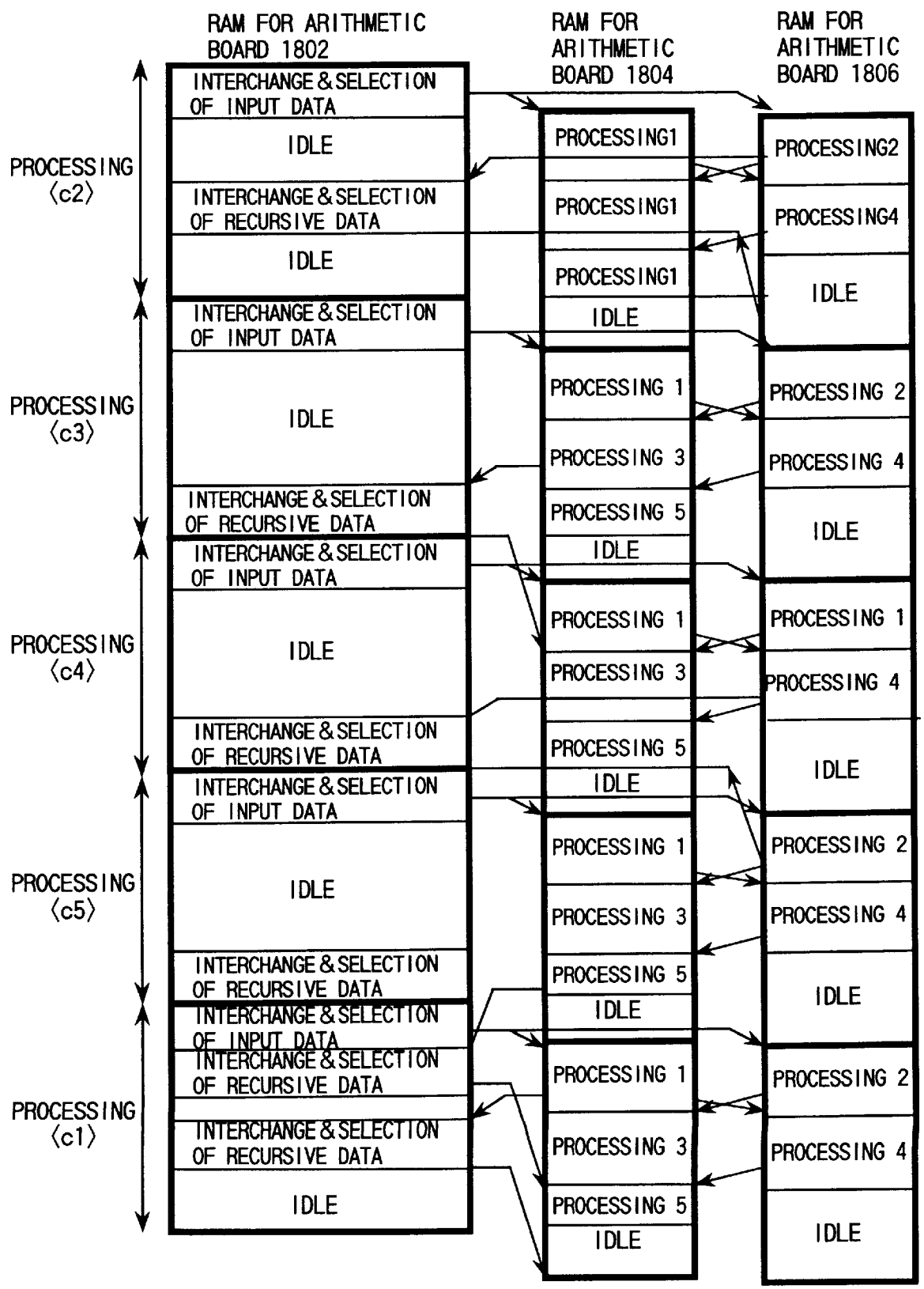
FIG. 31 is a view showing in detail the processing shown in FIG. 30.

FIG. 31 is a view showing in detail the processing shown in FIG. 30.

As the arithmetic boards 1804 and 1806 initiates their processing after receiving the input data from the transfer board 1802, the start time of the processing period of the arithmetic boards gets behind the start time of the processing period of the transfer board 1802.

After completing the processing 1, the arithmetic board 1804 transfers the processing result to the arithmetic board 1806. After completing the processing 2 and 4, the arithmetic board 1806 transfers the processing result to the arithmetic board 1804.

The transfer board 1802 exchanges and filters the recursive data. As this processing is initiated after terminating the processing for generating the target recursive data, the initiating timing for this processing within a single processing period is subject to the type of the target recursive data.

A series of processing are decomposed and dispatched to the three individual boards as shown in FIG. 31, it will be appreciated that the overall processing can be fully executed within a definite processing period even if a long time period is expected for performing the individual processing sequentially.

Figure 32:
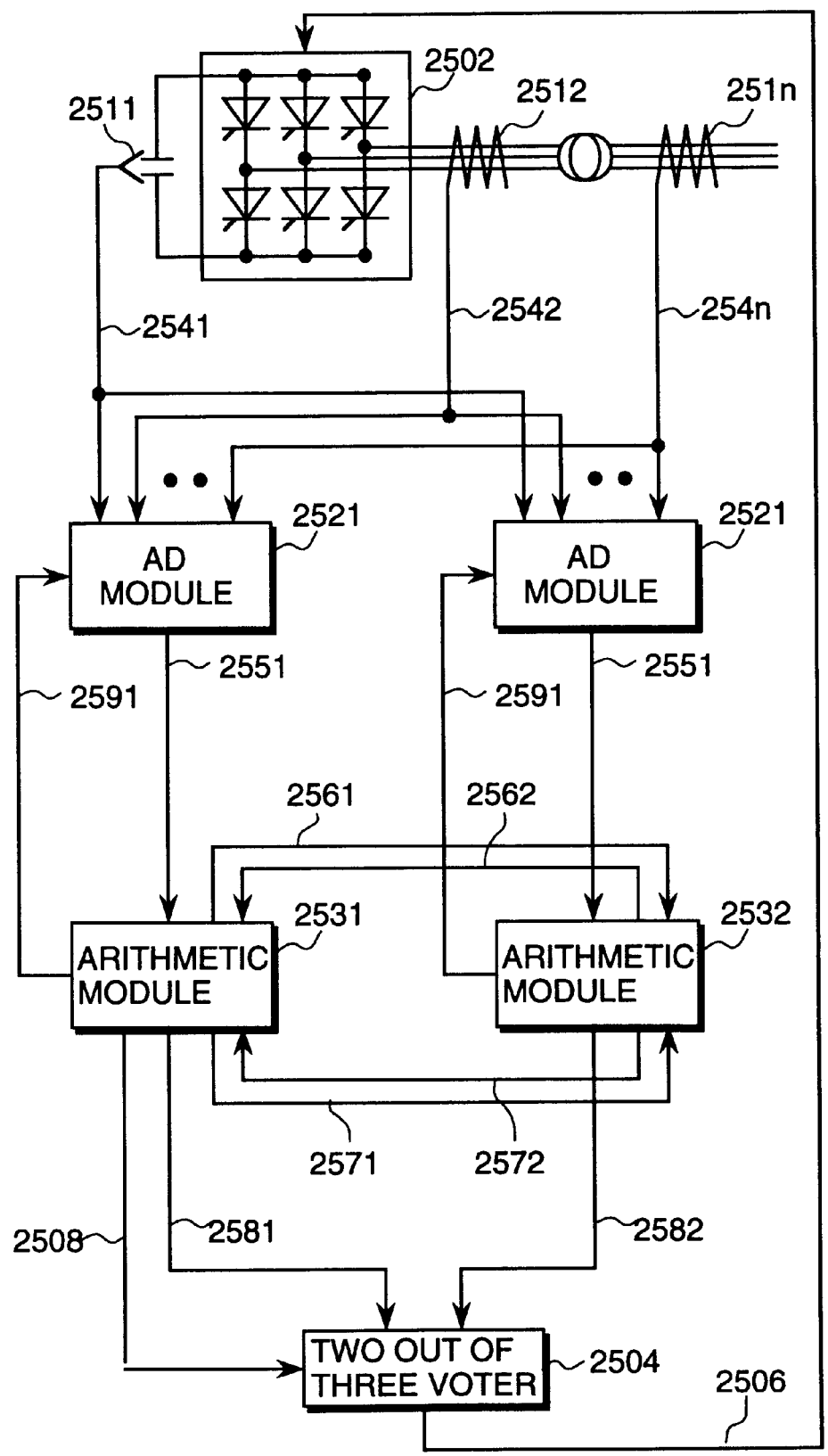
FIG. 32 is a block diagram showing the configuration of a second embodiment of a control apparatus for a power converter according to the present invention.

FIG. 32 is a block diagram showing the configuration of a second embodiment of a control apparatus for a power converter according to the present invention. As for the difference in this embodiment from the first embodiment shown in FIG. 1, AD modules and arithmetic modules are individually triplicated in the first embodiment, but in contrast, AD modules and arithmetic modules are individually duplicated in this embodiment. The power converter control apparatus has two AD modules 2521 and 2522 and two arithmetic modules 2531 and 2532. In order to establish a duplicated architecture, the arithmetic module 2531 is connected through the signal line 2508 to the selection circuit 2504 for supplying to the selection circuit 2504 the information judging whether any fault occurs within the arithmetic module itself. Another feature in the configuration is almost the same as that in the power converter control apparatus of the first embodiment, except that the number of connection wires is smaller due to the smaller number of AD modules and arithmetic modules.

In the power converter control apparatus in this embodiment, the selection circuit 2504 receives the fault information of the arithmetic module 2531 from the signal line 2508, and if there is no fault in the arithmetic module 2531, the output supplied on the signal line 2581 from the arithmetic module 2531 is selected and put out onto the signal line 2506. In contrast, if any fault occurs in the arithmetic module 2531, the output supplied on the signal line 2582 from the arithmetic module 2532 is selected and put out onto the signal line 2506.

Figure 33:
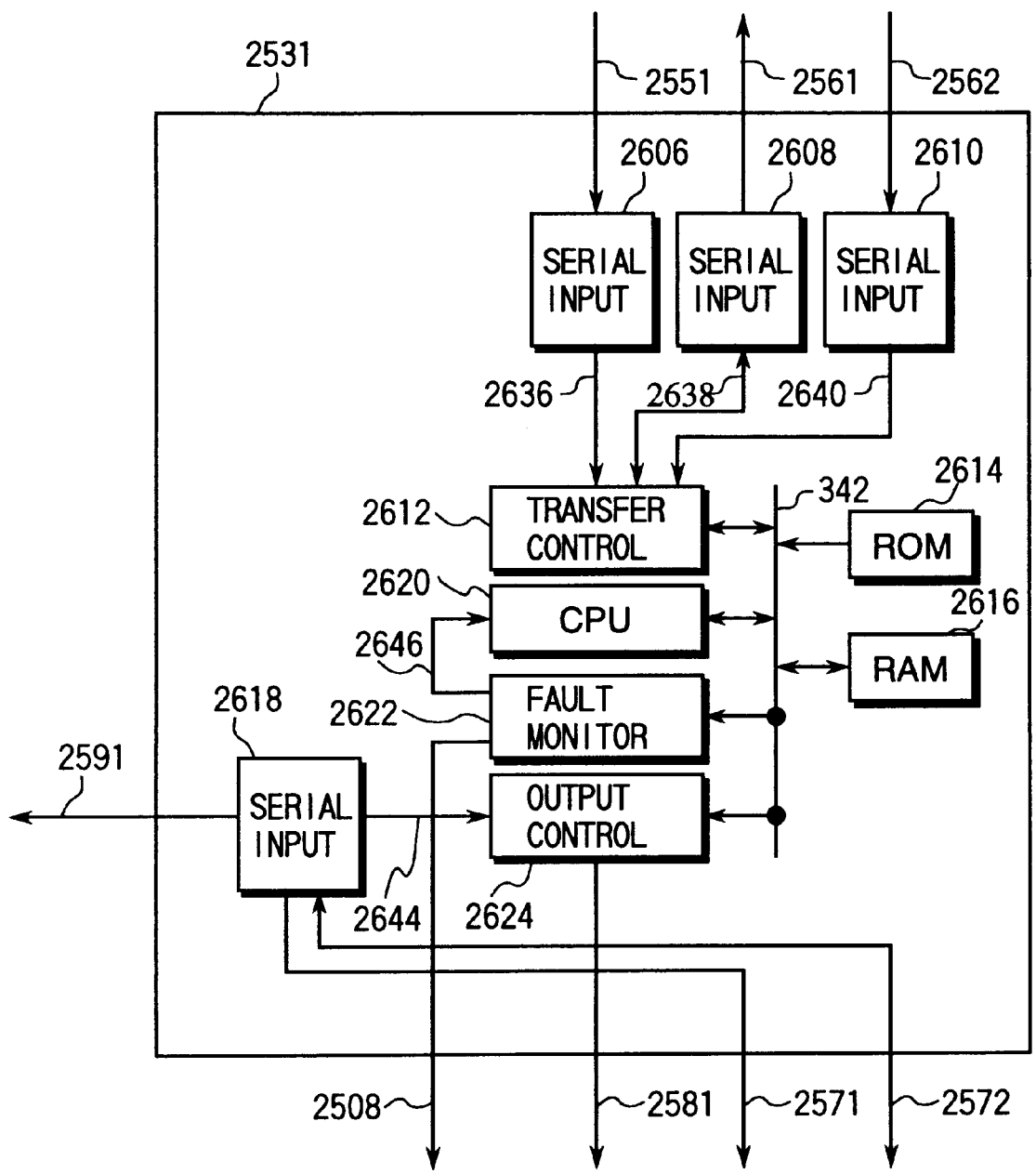
FIG. 33 is a block diagram showing concrete configuration of an arithmetic module 2531 shown in FIG. 32.

FIG. 33 is a block diagram showing concrete configuration of an arithmetic module 2531 shown in FIG. 32.

In FIG. 33, the signal lines 2551 and 2562 are connected to the input ports of the serial input circuits 2606 and 2610 for converting serial data to parallel data, and the output ports of the serial input circuits 2606 and 2610 are connected through the signal lines 2636 and 2649 to the input ports of the transfer control circuit 2612 which stored temporarily the input signal carried on the signal lines 2636 and 2640 into the internal memory and puts out the stored data in responsive to the data read-out request. The signal line 2561 is connected to the output port of the serial output circuit 2608 for converting parallel data to serial data, and the input port of the serial output circuit 2608 is connected through the signal line 2638 to the output port of the transfer control circuit 2612. The input/output port of the transfer control circuit 2612 is also connected to the bus 2642.

What are connected to the bus 2642 other than the transfer control circuit 2612 are individual input/output ports of the central control unit (CPU) 2620, the read only memory (ROM) 2614, the random access memory (RAM) 2616, the fault monitoring circuit 2622 for monitoring data on the bus 2642 and detecting such faults as a break of the bus 2642 and noises and the output control circuit 2624 for generating and outputting the control pulse for the power converter 2502. The output ports are connected to the input port of CPU 262 through the signal line 2646 and also to the signal line 2508. The input port of the output control circuit 2624 is connected through the signal line 2644 to the output port of the synchronous control circuit 2618 for generating the operation start signal for AD module 2521, and the output port of the output control circuit 2624 is connected to the signal line 2581. The output ports are connected also to the signal lines 2591 and 2571, and its input port is connected to the signal line 2572.

Next, the operation of the arithmetic module 2531 is described.

When the serial input circuits 2606 and 2610 receives serial data from the signal lines 2551 and 2562, respectively, then they convert the received serial data to the parallel data, and output the parallel data to the transfer control circuit 2612 through the signal lines 2636 and 2640, respectively.

When the serial output circuit 2608 receives parallel data from the transfer control circuit 2612 through the signal line 2638, then it converts the received parallel data into the serial data and outputs the serial data onto the signal line 2561.

When the transfer control circuit 2612 receives the parallel data from the serial input circuits 2606 and 2610 through the signal lines 2636 and 2640, then it stores temporarily the parallel data into the internal memory. When the transfer control circuit 2612 receives the data read-out request from CPU 2620 through the bus 2642, then it outputs the data stored in the memory through the bus 2642 to CPU 2620. In addition, when the transfer control circuit receives data from CPU 2620 through the bus 2642, then it stores the received data into the internal memory. After storing temporarily the data received from the serial input circuit 2606 or CPU 2620 into the internal memory, the transfer control circuit outputs the stored data through the signal line 2638 to the serial output circuit 2608.

CPU 2620 receives the data originated at two AD modules 2521 and 2522 from the transfer control circuit 2612 through the bus 2642 at a constant period, generates data for controlling the power converter 2502 by selecting data from valid AD modules, and supply the generated data to the output control circuit 2624 through the bus 2642. If it is required to transfer data to another arithmetic module 2532, CPU 2620 transfers necessary data to the transfer control circuit 2612 through the bus 2642.

The fault monitoring circuit 2611 observes the data on the bus 2642, and outputs the initializing signal to CPU 2620 through the signal line 2646 when detecting any fault. As for fault detection method, by supplying such signals as parity bits for error check on the bus 2642, invalid data are detected. It may be also allowed that CPU 2620 executes check programs for the sum check of ROM 2614 and the read/write check of RAM 2616, and reports the error status to the fault monitoring circuit 2622 through the bus 2642 if any error may be detected. The fault monitoring circuit 222 outputs the initiation signal as well as the information whether there occurs an fault onto the signal line 2508.

The synchronous control circuit 2618 exchanges synchronizing signals with the arithmetic module 2532 through the signals lines 2571 and 2572, generates the operation start signal for AD conversion and outputs the signal onto the signal line 2591. At the same time, the synchronous control circuit counts the time since the operation start signal becomes the logical level 1, and sends the count value to the output control circuit 2624 through the signal line 2644.

The output control circuit 2624 generates the control pulse for the power converter 2502 based on the time information received from the synchronous control circuit 2618 through the signal line 2644 and the control data received from CPU 2620 through the bus 2642, and outputs the control pulse to the selection circuit 2504 through the signal line 2581.

The arithmetic module 2532 of the power converter control apparatus shown in FIG. 32 is also configured and operated in the similar manner to the arithmetic module 2531.

Figure 34:
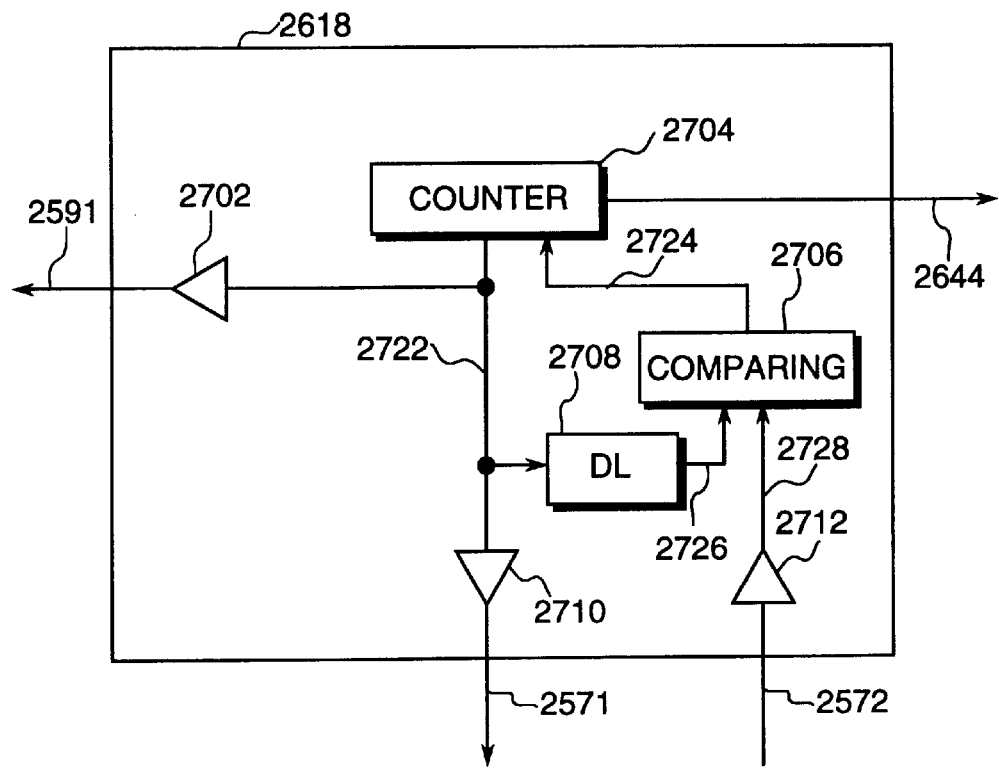
FIG. 34 is a block diagram showing concrete configuration of a synchronous control circuit 2618 shown in FIG. 33.

FIG. 34 is a block diagram showing concrete configuration of a synchronous control circuit 2618 shown in FIG. 33.

In FIG. 34, the signal line 2572 is connected to the input terminal of the buffer 2712, and the output terminal of the buffer 2712 is connected to one of the input terminals of the comparator 270 through the signal line 2728. Another input terminal of the comparator 2706 is connected through the signal line 2724 to the output terminal of the delay circuit (DL circuit) 270 for supplying the received signal with delay. The count value output terminal of the counter 2704 is connected to the signal line 2644, and the carry terminal for supplying the count termination signal is connected through the signal line 2722 to the input terminals of DL circuit 2708 and the buffers 2702 and 2710. The individual output terminals of the buffers 2702 and 2710 are connected to the signal lines 2591 and 2571, respectively.

Next, the operation of the synchronous control circuit 2618 is described.

The counter 2704 increments its count value every constant time period, and outputs the count values onto the signal line 2644. When the sum of the count value and the correction value received from the comparator 2706 through the signal line 2724 reaches a predetermined value, The counter 2704 outputs the operation start signal for AD conversion and resets the count value to be 0.

When DL circuit 2708 receives the operation start signal from the counter 2704 through the signal line 2722, it delays the operation start signal with a constant time period and outputs the delayed signal onto the signal line 2726. DL circuit 2798 is used for delaying the operation start signal for the arithmetic module 2531 with a time period required for exchanging the operation start signal with the arithmetic module 2532.

The buffer 2702 and 2710 receives the operation start signal from the counter 2704 through the signal line 2722, and outputs the operation start signals to AD module 2521 and the arithmetic module 2532 through the signal lines 2591 and 2571, respectively.

The buffer 2712 receives the operation start signal from the arithmetic modules 2532 through the signal line 2572, and send the received signal to the comparator 2706 through the signal line 2728.

The comparator 2706 receives the operation start signals for AD conversion at the arithmetic modules 2531 and 2532 through the signal lines 2726 and 2728, and calculates the correction value for the counter 2704 based on the time difference between those operation start signals and outputs the correction value to the counter 2704 through the signal line 2724.

Figure 35:
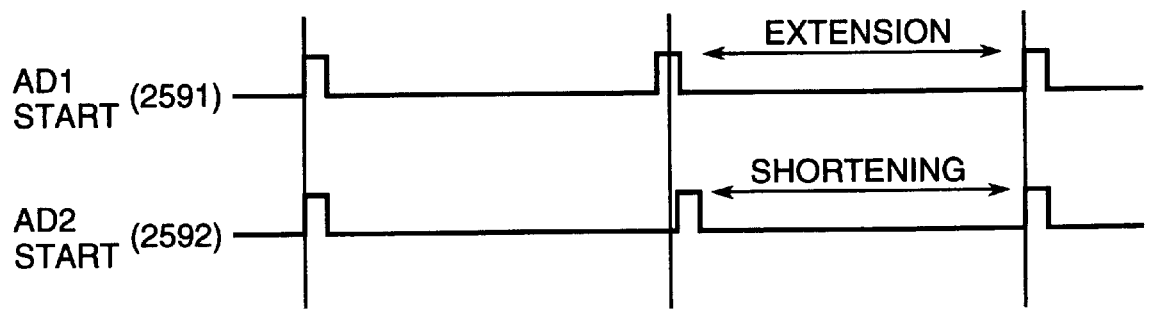
FIG. 35 is a timing chart illustrating the operation of the synchronous control circuit 2618 shown in FIG. 33.

FIG. 35 is a timing chart illustrating the operation of the synchronous control circuit 2618 shown in FIG. 33.

The counter 2704 of the individual arithmetic modules 2531 and 2532 increments the count value one by one in a constant time period, and outputs the operation start signal when the sum of the count value and the correction value reaches a predetermined value. In this example, it is assumed that the counter for the arithmetic module 2531 is incremented in shorter period than the counter for the arithmetic module 2532 is.

In the first AD conversion start timing, as the operation start signal output from the arithmetic module 2531 and the operation start signal output from the arithmetic module 2532 have an identical timing, the correction value is 0. In the second AD conversion start timing, as the operation start signal output from the arithmetic module 2531 comes earlier than the operation start signal output from the arithmetic module 2532 does. Therefore, as the correction value for the arithmetic module 2531 is negative, the operation start timing is delayed to the expected start timing; as the correction value for the arithmetic module 2532 is positive, the operation start timing is earlier than the expected start timing. Consequently, the operation start signal output from the arithmetic module 2531 and the operation start signal output from the arithmetic module 2532 have an almost identical timing.

Figure 36:
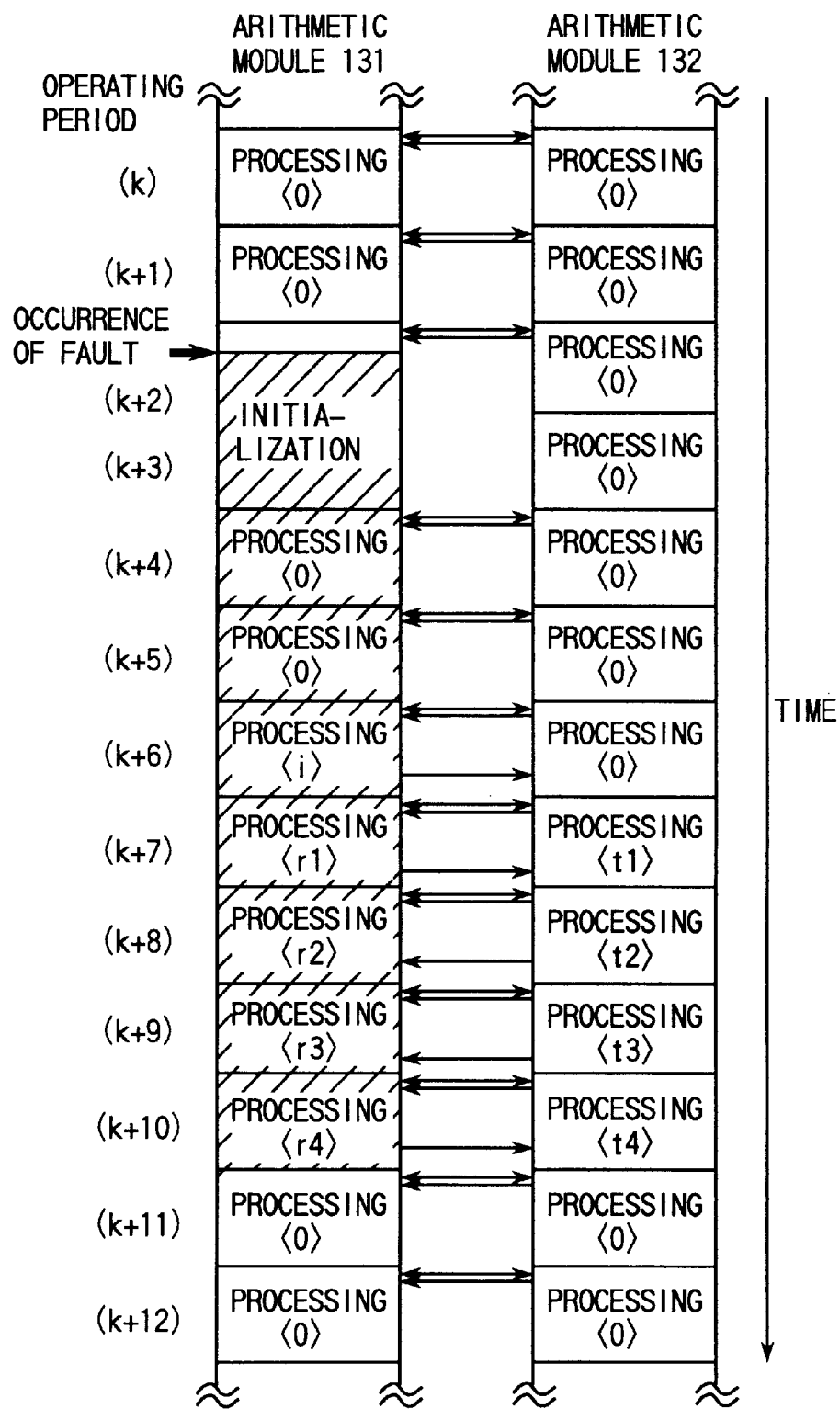
FIG. 36 is a view showing an embodiment of a processing method performed when a fault is detected in an arithmetic module 2531 of the control apparatus of the power converter shown in FIG. 33.

FIG. 36 is a view showing an embodiment of a processing method performed when a fault is detected in an arithmetic module 2531 of the control apparatus of the power converter shown in FIG. 33.

This embodiment is a case that the arithmetic module 133 is eliminated in the embodiment shown in FIG. 20. As the power converter is controlled by using the output signal from the arithmetic module 2532 while the arithmetic module 2531 outputs invalid data, it will be appreciate that the arithmetic module 2531 can be recovered to a normal operation mode without suspending the power converter similarly as shown in the embodiment of FIG. 20.

In this embodiment, as the selection of outputs of the arithmetic modules 251 and 2532 depends on the fault detecting function of the arithmetic module 2531, it is an weak point that a false output signal may be output to the power converter when any undetectable fault occurs, but it is an advantageous point that the amount of system components can be reduced to be almost ⅔ of the power converter control apparatus shown in FIG. 1.

Though some embodiments of the present invention have been described by referring to the example in applying the present invention to the power converter control apparatus, it is apparent that the present invention is applicable to another type of control apparatus.

As described above in some detail, in the multiplexing control apparatus to which the present invention is applied, it will be appreciated that a fault-detected system, if any occurs, can be recovered to a normal operation mode without suspending the devices under control by means that the control data are made to be transferred from the normal-operated system to the fault-detected system while continuing the operation of the normal-operated system.

What is claimed is:

1. A fault recovery method for a replicated controller replicated for performing the same processing at a predetermined period in a plurality of systems to output control signals for an equipment to be controlled, in which a control data is transferred from a normally operating system to the faulty system to restore the faulty system into a normal state, when failure is detected in one of a plurality of systems in said replicated controller, said method comprising the steps of:

dividing said control data into a plurality of blocks on the basis of dependency of said blocks; and transferring said plurality of blocks in a sequential order of superiority of the dependency from said normally operating system to said faulty system over a plurality of operating periods.

2. A fault recovery method as set forth in claim 1, wherein after performing normal processing for a given period in said faulty system, the control data is transferred from said normally operating system to said faulty system.

3. A fault recovery method as set forth in claim 1, wherein one of a plurality of blocks are exchanged between said systems per each operating period irrespective of presence and absence of failure detection so that a value having the highest certainty of validness is presumed for using in the next operating period when inconsistency is present between the values in respective systems.

4. A replicated controller comprising:

a plurality of controllers replicated for performing the same processing in a predetermined period in a plurality of systems to output a control signal to an equipment to be controlled;

selection circuit selecting a value having the highest certainty of validness among outputs from said plurality of controllers for outputting to said equipment;

each of said controller having a transfer region storing data necessary for restoring a faulty controller into a normal state, when failure is caused in one of a plurality of controllers; and said transfer region having a plurality of regions for storing data divided into a plurality of blocks depending upon dependency between said blocks so that data stored in said plurality of blocks are transferred from a normally operated system to said faulty system in a sequential order of superiority of dependency, in a period of a plurality of operating periods.

* * * * *

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

Page 1 of 6

It is certified that error appears in the above-identified patent and that said Letters Patent is hereby corrected as shown below:

In the Abstract: Line 11, change "BY" to --By--.

| Column | Line | |
|---|---|---|
| 1 | 13 | After "required" insert --to have--. |
| 1 | 30 | Change "with" to --while--. |
| 2 | 19 | After "failure" insert --occurs--. |
| 3 | 11 | Change "a reaching" to --the extent of the--. |
| 3 | 65 | After "present" insert --invention--. |
| 4 | 42 | Change "transfers" to --transfer--. |
| 4 | 61 | Change "toe" to --to--. |
| 5 | 9 | Change "performs" to --perform--. |

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

It is certified that error appears in the above-identified patent and that said Letters Patent is hereby corrected as shown below:

| Column | Line | |
|--------|------|---|
| 5 | 11 | Change "performs" to --perform--. |
| 5 | 17 | Change "module" to --modules--. |
| 5 | 28 | Change "in a" to --as a--. |
| 6 | 30 | Change "module" to --modules--. |
| 6 | 61 | Change "own" to --    --. |
| 9 | 7 | Delete "An". |
| 9 | 8 | Change "input/output" to --Input/output--. |
| 10 | 30 | Change "when" to --when--. |
| 10 | 61 | Change "reach" to --reaches--. |
| 12 | 44 | Change "modules" to --module--. |
| 12 | 47 | Change "modules" to --module--. |

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

It is certified that error appears in the above-identified patent and that said Letters Patent is hereby corrected as shown below:

| Column | Line | |
|---|---|---|
| 13 | 47 | Change "an" to --a--. |
| 14 | 18 | Change "may" to --may be--. |
| 14 | 24 | Change "is" to --are--. |
| 14 | 43 | Change "is" to --are--. |
| 14 | 62 | Change "decomposed" to --carried out--. |
| 15 | 19 | Change "remains" to --continues--. |
| 15 | 38 | change "while" to --during--. |
| 15 | 52 | Change "allow" to --allowing--. |
| 15 | 67 | Change "during" to --performing--. |
| 16 | 3 | Change "processing" to --process--. |
| 16 | 10 | Change "takes" to --take--. |

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

It is certified that error appears in the above-identified patent and that said Letters Patent is hereby corrected as shown below:

| Column | Line | |
|---|---|---|
| 16 | 12 | Change "the start of" to --to start the--. |
| 17 | 7 | Change "during" to --while--; change "At" to --at--.. |
| 17 | 10 | Change "validive" to --valid--. |
| 17 | 47 | Change "is" to --has--. |
| 17 | 51 | Change "performs normally" to --normally perform--. |
| 17 | 55 | Change "is detected" to --be detected--. |
| 17 | 64 | Change "allow" to --allowing--. |
| 18 | 7 | Change "during" to --doing--. |
| 18 | 9 | Change "processing" to --process--. |
| 19 | 5 | Change "processing" to --process--. |
| 19 | 7 | Change "find" to --be found--; change "is" to --has--. |

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

It is certified that error appears in the above-identified patent and that said Letters Patent is hereby corrected as shown below:

| Column | Line | |
|---|---|---|
| 19 | 3  | Change "is" to --are--. |
| 19 | 26 | Change "is" to --are--. |
| 19 | 30 | Change "is" to --are--. |
| 19 | 34 | Change "is" to --are--. |
| 20 | 60 | Change "receive" to --receives--. |
| 20 | 40 | Change "is" to --has--. |
| 21 | 9  | Change "is" to --are--. |
| 21 | 60 | Change "initiates" to --initiate--. |
| 22 | 8  | After "processing" insert --steps--; change "decomposed" to --decoded--. |
| 23 | 14 | Change "receives" to --receive--. |

UNITED STATES PATENT AND TRADEMARK OFFICE
CERTIFICATE OF CORRECTION

PATENT NO. : 6,038,683

DATED : March 14, 2000

INVENTOR(S) : Kotaro SHIMAMURA et al.

It is certified that error appears in the above-identified patent and that said Letters Patent is hereby corrected as shown below:

| Column | Line | |
|--------|------|---|
| 23 | 43 | Change "supply" to --supplies--. |
| 23 | 59 | Change "an fault" to --a fault--. |
| 24 | 53 | Change "send" to --sends--. |
| 25 | 10 | Delete "as". |
| 25 | 30 | Change "appreciate" to --appreciated--. |
| 26 | 40 | Change "controller" to --controllers--. |

Signed and Sealed this

Seventeenth Day of April, 2001

Attest:

NICHOLAS P. GODICI

Attesting Officer

Acting Director of the United States Patent and Trademark Office